(12) United States Patent
Sakurai et al.

(10) Patent No.: US 11,441,753 B2
(45) Date of Patent: Sep. 13, 2022

(54) OPTICAL UNIT

(71) Applicant: KOITO MANUFACTURING CO., LTD., Tokyo (JP)

(72) Inventors: Kazutoshi Sakurai, Shizuoka (JP); Hidetada Tanaka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/356,638

(22) Filed: Jun. 24, 2021

(65) Prior Publication Data
US 2021/0317968 A1 Oct. 14, 2021

Related U.S. Application Data

(63) Continuation of application No. PCT/JP2019/049022, filed on Dec. 13, 2019.

(30) Foreign Application Priority Data

Dec. 25, 2018 (JP) .............................. JP2018-241016
Dec. 25, 2018 (JP) .............................. JP2018-241017
(Continued)

(51) Int. Cl.
*F21S 41/675* (2018.01)
*F21S 41/148* (2018.01)
*G02B 26/08* (2006.01)

(52) U.S. Cl.
CPC ........... *F21S 41/675* (2018.01); *F21S 41/148* (2018.01); *G02B 26/0816* (2013.01)

(58) Field of Classification Search
CPC .... G02B 26/0816; F21S 41/675; F21S 41/148
See application file for complete search history.

(56) References Cited

U.S. PATENT DOCUMENTS

2013/0038736 A1*  2/2013  Yamamura ............ F21S 41/155
                                              348/148
2013/0163267 A1   6/2013  Okubo et al.
(Continued)

FOREIGN PATENT DOCUMENTS

JP      S61-147587 A      7/1986
JP      2013-134971 A     7/2013
(Continued)

OTHER PUBLICATIONS

International Search Report (Form PCT/ISA/210) dated Mar. 3, 2020, in corresponding International Application No. PCT/JP2019/049022. (13 pages).
(Continued)

*Primary Examiner* — Matthew J. Peerce
(74) *Attorney, Agent, or Firm* — Buchanan Ingersoll & Rooney PC

(57) ABSTRACT

An optical unit includes a first light source, a second light source, a rotary reflector that rotates about an axis of rotation while reflecting first light emitted from the first light source, and a projection lens that projects the first light reflected by the rotary reflector into a light illuminating direction of the optical unit to form a first light distribution pattern. The second light source is disposed such that second light emitted from the second light source enters the projection lens without being reflected by the rotary reflector. The projection lens is configured to project the second light into the light illuminating direction of the optical unit to form a second light distribution pattern such that the second light distribution pattern overlaps an end portion of the first light distribution pattern in a right-left direction.

5 Claims, 21 Drawing Sheets

(30) Foreign Application Priority Data

Dec. 25, 2018 (JP) .............................. JP2018-241018
Dec. 25, 2018 (JP) .............................. JP2018-241019

(56) References Cited

U.S. PATENT DOCUMENTS

2017/0241605 A1  8/2017  Yamamoto
2018/0106447 A1  4/2018  Tanaka et al.

FOREIGN PATENT DOCUMENTS

| JP | 2015-035337 A | 2/2015 |
| JP | 2017-147154 A | 8/2017 |
| JP | 2018-067523 A | 4/2018 |

OTHER PUBLICATIONS

International Preliminary Report on Patentability (Form PCT/IB/373) and the Written Opinion of the International Searching Authority (Form PCT/ISA/237) dated Jun. 16, 2021, in corresponding International Application No. PCT/JP2019/049022. (28 pages).

\* cited by examiner

26

26

40

OPTICAL UNIT

BACKGROUND

1. Field of the Invention

The present invention relates to optical units.

2. Description of the Related Art

In one device devised in recent years, light emitted from a light source is reflected toward a space in front of a vehicle, and this reflected light scans a region in front of the vehicle to form a predetermined light distribution pattern. For example, there is known an optical unit that includes a light source constituted by a light emitting element and a rotary reflector that rotates in one direction about an axis of rotation while reflecting light emitted from the light source. The rotary reflector is provided with a reflective surface such that the light emitted from the light source and reflected by the rotating rotary reflector forms a desired light distribution pattern (see patent document 1).

This optical unit includes a first light source, a second light source, a rotary reflector that rotates about an axis of rotation while reflecting first light emitted from the first light source, and a projection lens that projects the first light reflected by the rotary reflector into a light illuminating direction of the optical unit. The second light source is disposed such that second light emitted from the second light source enters the projection lens without being reflected by the rotary reflector, and the projection lens projects the second light into the light illuminating direction of the optical unit.

[patent document 1] JP2018-67523

(1) A high-beam light distribution pattern formed by the optical unit described above is a combination of a condensed light distribution pattern and a diffused light distribution pattern. Therefore, the border of a region where the diffused light distribution pattern and the condensed light distribution pattern overlap each other can be salient.

(2) Again, the high-beam light distribution pattern formed by the optical unit described above is a combination of a condensed light distribution pattern and a diffused light distribution pattern. The diffused light distribution pattern illuminates mainly an outward region of the condensed light distribution pattern and can thus increase the size of the illumination region of the high-beam light distribution pattern.

(3) The first light source included in the optical unit described above includes a plurality of light emitting modules disposed in an array, and a condenser lens including a plurality of lens portions that correspond to the respective light emitting surfaces of the light emitting modules is disposed so as to face the light emitting surfaces. The condensed light distribution pattern formed by the optical unit described above corresponds to the pattern of the light emitting surface (light exit surface) of the condenser lens. Therefore, to increase the size of the illumination region, the condenser lens needs to have a larger light emitting surface.

(4) Again, the first light source included in the optical unit described above includes a plurality of light emitting modules disposed in an array, and the condenser lens including a plurality of lens portions that correspond to the respective light emitting surfaces of the light emitting modules is disposed so as to face the light emitting surfaces.

However, since the plurality of lens portions are located close to each other, some of the light emitted from one light emitting module may enter the lens portion corresponding to the light emitting module adjacent to the one light emitting module, and this can cause glare.

SUMMARY OF THE INVENTION

The present invention has been made in view of the above issues, and (1) one exemplary object of the present invention is to provide a novel technique that contributes to forming a more natural light distribution pattern.

(2) Another exemplary object of the present invention is to provide a novel technique that can increase the maximum luminous intensity while increasing the size of the illumination region of a light distribution pattern.

(3) Another exemplary object of the present invention is to increase the size of the illumination region of a light distribution pattern through an innovative configuration of an optical member.

(4) Another exemplary object of the present invention is to provide a novel optical member that can keep glare from arising.

(1) An optical unit according to an aspect of the present invention includes a first light source, a second light source, a rotary reflector, and a projection lens. The rotary reflector rotates about an axis of rotation while reflecting first light emitted from the first light source. The projection lens projects the first light reflected by the rotary reflector into a light illuminating direction of the optical unit to form a first light distribution pattern. The second light source is disposed such that second light emitted from the second light source enters the projection lens without being reflected by the rotary reflector. The projection lens is configured to project the second light into the light illuminating direction of the optical unit to form a second light distribution pattern such that the second light distribution pattern overlaps an end portion of the first light distribution pattern in a right-left direction. The projection lens includes a horizontally diffusing portion formed in a portion of the projection lens, and the horizontally diffusing portion diffuses the second light mainly in the right-left direction.

(2) An optical unit according to an aspect of the present invention includes a first light source, a second light source, a rotary reflector, a projection lens, and an optical member. The second light source includes a plurality of light emitting elements. The rotary reflector rotates about an axis of rotation while reflecting first light emitted from the first light source. The projection lens projects the first light reflected by the rotary reflector into a light illuminating direction of the optical unit to form a first light distribution pattern. The optical member deflects an optical path of second light emitted from the second light source away from the rotary reflector to direct the optical path toward the projection lens. The projection lens is configured to project the second light into the light illuminating direction of the optical unit to form a second light distribution pattern such that the second light distribution pattern illuminates an outward region of the first light distribution pattern in a right-left direction. The optical member is configured to form the second light distribution pattern by superposing partial light distribution patterns formed by respective element lights emitted from the plurality of light emitting elements.

Another aspect of the present invention provides also an optical unit. This optical unit includes a light source, a first lens, and a second lens. The light source includes a plurality of light emitting elements. The first lens projects light emitted from the light source into a light illuminating direction of the optical unit to form a light distribution pattern. The second lens directs an optical path of the light emitted from the light source toward the first lens. The second lens is configured to form the light distribution pattern by superposing partial light distribution patterns formed by respective element lights emitted from the plurality of light emitting elements.

(3) An optical unit according to an aspect of the present invention includes a light source, an optical member, and a second lens. The light source includes a plurality of light emitting elements disposed in an array. The optical member includes a plurality of first lenses corresponding to the respective light emitting elements and condenses light emitted from the light source. The second lens projects light transmitted through the optical member into a light illuminating direction of the optical unit to form a light distribution pattern. At least one first lens of the plurality of first lenses includes a condensing lens portion and an expanding lens portion. The condensing lens portion is located in front of a light emitting surface of a corresponding one of the light emitting elements. The expanding lens portion expands a luminous region of the at least one first lens by receiving light emitted diagonally from the light emitting surface and causing the light to exit the at least one first lens into a front direction of the at least one first lens.

Another aspect of the present invention provides also an optical unit. This optical unit includes a light source, a first lens, and a second lens. The light source includes a light emitting element. The first lens corresponds to the light emitting element and condenses light emitted from the light emitting element. The second lens projects light transmitted through the first lens into a light illuminating direction of the optical unit to form a light distribution pattern. The first lens includes a condensing lens portion and an expanding lens portion. The condensing lens portion is located in front of a light emitting surface of the light emitting element. The expanding lens portion expands a luminous region of the first lens by receiving light emitted diagonally from the light emitting surface and causing the light to exit the first lens into a front direction of the first lens.

(4) An optical unit according to an aspect of the present invention includes a light source, an optical member, and a second lens. The light source includes a plurality of light emitting elements disposed in an array. The optical member includes a plurality of first lenses corresponding to the respective light emitting elements and condenses light emitted from the light source. The second lens projects light transmitted through the optical member into a light illuminating direction of the optical unit to form a light distribution pattern. At least one first lens of the plurality of first lenses includes an optical path changer that changes an optical path of light emitted from a corresponding one of the light emitting elements such that the light emitted from the corresponding light emitting element does not directly enter an adjacent first lens of the plurality of first lenses that is adjacent to the at least one first lens.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

Figure 1:
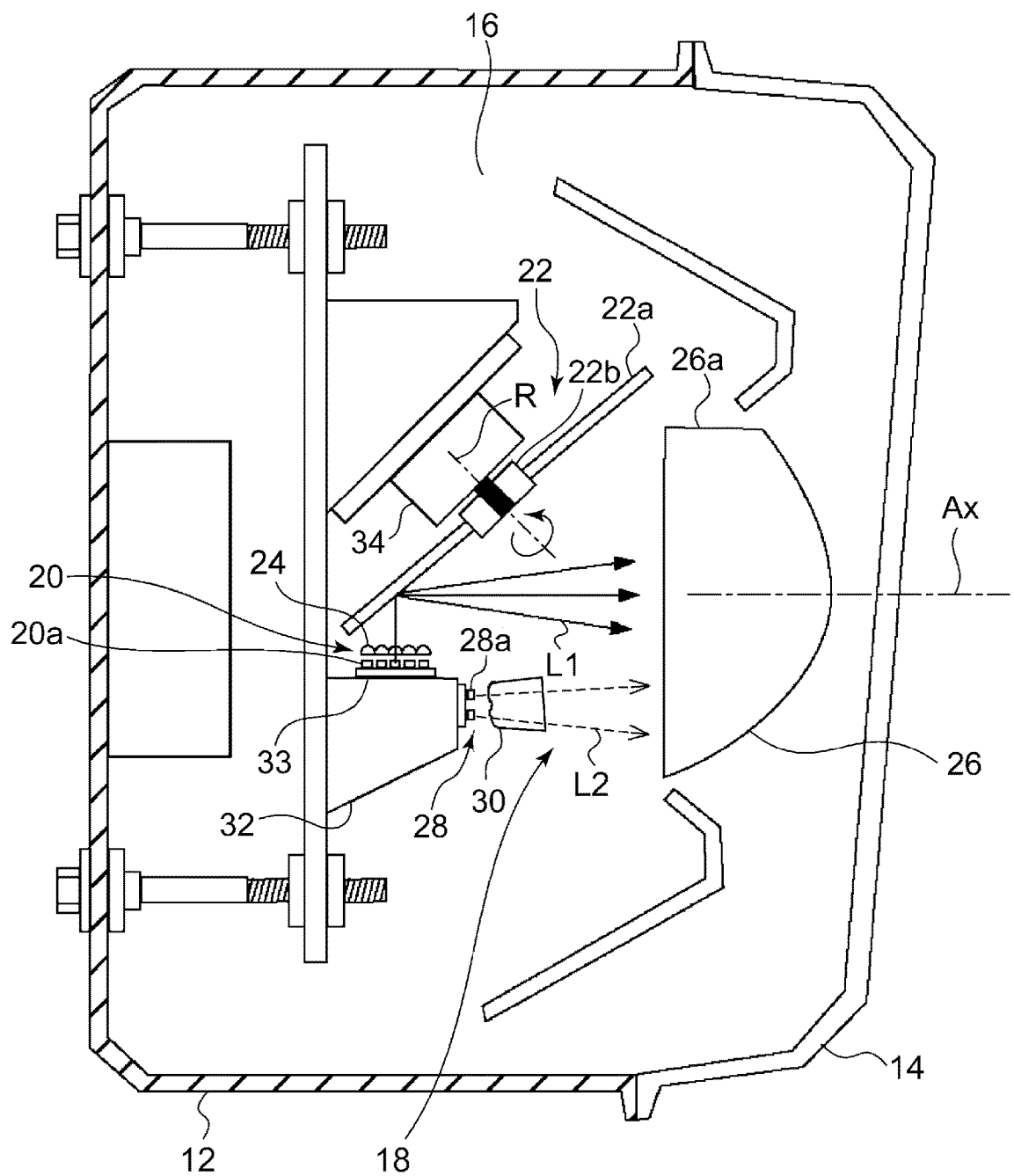
FIG. 1 is a schematic horizontal sectional view of a vehicle headlamp according to an embodiment.

DETAILED DESCRIPTION OF THE INVENTION (1) An optical unit according to an aspect of the present invention includes a first light source, a second light source, a rotary reflector, and a projection lens. The rotary reflector rotates about an axis of rotation while reflecting first light emitted from the first light source. The projection lens projects the first light reflected by the rotary reflector into a light illuminating direction of the optical unit to form a first light distribution pattern. The second light source is disposed such that second light emitted from the second light source enters the projection lens without being reflected by the rotary reflector. The projection lens is configured to project the second light into the light illuminating direction of the optical unit to form a second light distribution pattern such that the second light distribution pattern overlaps an end portion of the first light distribution pattern in a right-left direction. The projection lens includes a horizontally diffusing portion formed in a portion of the projection lens, and the horizontally diffusing portion diffuses the second light mainly in the right-left direction.

According to this aspect, the second light projected to form the second light distribution pattern that overlaps an end portion of the first light distribution pattern in the right-left direction is diffused in the right-left direction by the horizontally diffusing portion formed in a portion of the projection lens. Therefore, the boundary of the portion where the first light distribution pattern and the second light distribution pattern overlap each other becomes less salient.

The projection lens may include an entry surface having a first entry region that receives the first light and a second entry region that receives the second light. The horizontally diffusing portion may be formed in the second entry region. This configuration allows the first light distribution pattern and the second light distribution pattern to be diffused in different manners.

The horizontally diffusing portion has a smaller area than the second entry region. This configuration can lessen any decrease in the luminous intensity of the second light distribution pattern associated with the diffusion, as compared to the case where the horizontally diffusing portion is formed in the entire second entry region.

The projection lens may further include an exit surface via which the first light and the second light exit the projection lens. The exit surface may include a vertically diffusing portion formed therein, and the vertically diffusing portion may diffuse the first light and the second light mainly in an up-down direction. In this manner, when the vertically diffusing portion is formed in the exit surface and the horizontally diffusing portion is formed in the entry surface, the light passing therethrough can be diffused in different manners in the up-down direction and in the right-left direction depending on the region where the light is transmitted.

The first entry region may be a non-diffusing portion. This configuration makes it possible to diffuse the first light distribution pattern only in the up-down direction.

(2) An optical unit according to an aspect of the present invention includes a first light source, a second light source, a rotary reflector, a projection lens, and an optical member. The second light source includes a plurality of light emitting elements. The rotary reflector rotates about an axis of rotation while reflecting first light emitted from the first light source. The projection lens projects the first light reflected by the rotary reflector into a light illuminating direction of the optical unit to form a first light distribution pattern. The optical member deflects an optical path of second light emitted from the second light source away from the rotary reflector to direct the optical path toward the projection lens. The projection lens is configured to project the second light into the light illuminating direction of the optical unit to form a second light distribution pattern such that the second light distribution pattern illuminates an outward region of the first light distribution pattern in a right-left direction. The optical member is configured to form the second light distribution pattern by superposing partial light distribution patterns formed by respective element lights emitted from the plurality of light emitting elements.

According to this aspect, the maximum luminous intensity of the second light distribution pattern can be increased.

The optical member may include a light controlling surface that controls separately optical paths of the respective element lights emitted from the plurality of light emitting elements. This configuration makes it possible to control separately the optical paths of the plurality of light emitting elements with a single optical member.

The light controlling surface may include an entry surface that includes a first light controlling surface and a second light controlling surface. The first light controlling surface may receive second light emitted from one of the plurality of light emitting elements. The second light controlling surface may receive second light emitted from another one of the plurality of light emitting elements and may be different from the first light controlling surface. This configuration makes it possible to control separately the optical paths of the lights emitted from the plurality of light emitting elements. The first light controlling surface and the second light controlling surface may partially overlap each other.

The first light controlling surface and the second light controlling surface may be disposed next to each other in the up-down direction. This configuration can reduce the width of the optical unit, for example.

The light controlling surface may include an exit surface serving as a continuous third light controlling surface. The second light that has entered the optical member via the first light controlling surface and the second light that has entered the optical member via the second light controlling surface may exit the optical member via the third light controlling surface. With this configuration, both the second light that has entered the optical member via the first light controlling surface and the second light that has entered the optical member via the second light controlling surface exit the optical member via the third light controlling surface serving as the common exit surface, and this makes it simpler to design the exit surface.

The second light source may be disposed such that the second light transmitted through the optical member enters the projection lens via a region that lies on an outer side of a region where the first light enters the projection lens. This configuration allows the second light distribution pattern to be projected onto a region on an outer side of the first light distribution pattern in the right-left direction.

Another aspect of the present invention provides also an optical unit. This optical unit includes a light source, a first lens, and a second lens. The light source includes a plurality of light emitting elements. The first lens projects light emitted from the light source into a light illuminating direction of the optical unit to form a light distribution pattern. The second lens directs an optical path of the light emitted from the light source toward the first lens. The second lens is configured to form the light distribution pattern by superposing partial light distribution patterns formed by respective element lights emitted from the plurality of light emitting elements.

According to this aspect, the maximum luminous intensity of the light distribution pattern can be increased without any improvement in the performance of the light emitting elements.

(3) An optical unit according to an aspect of the present invention includes a light source, an optical member, and a second lens. The light source includes a plurality of light emitting elements disposed in an array. The optical member includes a plurality of first lenses corresponding to the respective light emitting elements and condenses light emitted from the light source. The second lens projects light transmitted through the optical member into a light illuminating direction of the optical unit to form a light distribution pattern. At least one first lens of the plurality of first lenses includes a condensing lens portion and an expanding lens portion. The condensing lens portion is located in front of a light emitting surface of a corresponding one of the light emitting elements. The expanding lens portion expands a luminous region of the at least one first lens by receiving light emitted diagonally from the light emitting surface and causing the light to exit the at least one first lens into a front direction of the at least one first lens.

According to this aspect, the luminous region of the first lens can be expanded by the expanding lens portion, and thus the size of the illumination region of the light distribution pattern can be increased.

The expanding lens portion may be a Fresnel lens. This configuration can help reduce the thickness of the expanding lens portion.

The expanding lens portion may include a reflective surface that totally reflects incident light into the front direction of the at least one first lens. This configuration can cause the light emitted from the light emitting surface in a direction closer to the horizontal direction to travel in the front direction of the first lens.

The optical unit may further include a rotary reflector that rotates about an axis of rotation while reflecting the light transmitted through the optical member. The rotary reflector may reflect and scan a pattern of the luminous region of the first lens to form a part of the light distribution pattern. This configuration makes it possible to further increase the size of the illumination region of the light distribution pattern.

The optical unit may reflect and scan a pattern of a portion, of the luminous region of the first lens, that corresponds to the expanding lens portion to form an upper region of the light distribution pattern. This configuration can increase the size the region of the light distribution pattern in the vertical direction.

The optical member may be configured such that the luminous region of the first lens or a virtual image of the luminous region is located at or around a focal point of the second lens. With this configuration, the luminous region of the first lens is projected in front of the second lens as a light source.

Another aspect of the present invention provides also an optical unit. This optical unit includes a light source, a first lens, and a second lens. The light source includes a light emitting element. The first lens corresponds to the light emitting element and condenses light emitted from the light emitting element. The second lens projects light transmitted through the first lens into a light illuminating direction of the optical unit to form a light distribution pattern. The first lens includes a condensing lens portion and an expanding lens portion. The condensing lens portion is located in front of a light emitting surface of the light emitting element. The expanding lens portion expands a luminous region of the first lens by receiving light emitted diagonally from the light emitting surface and causing the light to exit the first lens into a front direction of the first lens.

According to this aspect, the luminous region of the first lens can be expanded by the expanding lens portion, and thus the size of the illumination region of the light distribution pattern can be increased.

(4) An optical unit according to an aspect of the present invention includes a light source, an optical member, and a second lens. The light source includes a plurality of light emitting elements disposed in an array. The optical member includes a plurality of first lenses corresponding to the respective light emitting elements and condenses light emitted from the light source. The second lens projects light transmitted through the optical member into a light illuminating direction of the optical unit to form a light distribution pattern. At least one first lens of the plurality of first lenses includes an optical path changer that changes an optical path of light emitted from a corresponding one of the light emitting elements such that the light emitted from the corresponding light emitting element does not directly enter an adjacent first lens of the plurality of first lenses that is adjacent to the at least one first lens.

According to this aspect, it becomes less likely that the light emitted from a light emitting element enters an adjacent first lens different from the corresponding first lens. Therefore, this configuration makes it possible to suppress glare that could arise when light emitted from a light emitting element directly enters an adjacent first lens.

The optical path changer may include a reflective surface that totally reflects incident light toward an exit surface of the adjacent first lens. This configuration makes it possible to change the optical path of the light that exits the adjacent first lens via the exit surface.

The reflective surface of the optical path changer may be configured such that the light that has exited the adjacent first lens via the exit surface does not travel toward the second lens. This configuration can suppress glare that could arise when the light that exits the adjacent first lens is projected by the second lens.

The optical path changer may include an entry portion that receives light emitted diagonally from the light emitting surface of the light emitting element and traveling not toward the at least one first lens but toward the adjacent first lens. The entry portion may be a projection portion that projects from the first lens toward the opposing light emitting element. The projection portion may be provided in a region between two adjacent first lenses. This configuration makes it more likely that the light emitted diagonally from the light emitting surface of a light emitting element toward the adjacent first lens enters the projection portion.

The optical unit may further include a rotary reflector that rotates about an axis of rotation while reflecting the light transmitted through the optical member toward the second lens. The light source may be disposed such that a vertical direction of light emitting surfaces of the light emitting elements intersects with an optical axis of the second lens. The rotary reflector may be disposed such that the axis of rotation is inclined relative to the vertical direction of the light emitting surfaces and the optical axis. The optical member may be disposed between the plurality of light emitting elements and the rotary reflector. The optical path changer may be configured such that the light that has exited the adjacent first lens via the exit surface travels toward a gap region between the second lens and the rotary reflector. This configuration keeps the light whose optical path has been changed by the optical path changer from being projected forward by the second lens, and this can keep glare from arising in front of the vehicle.

Any optional combination of the above constituent elements or an embodiment obtained by converting what is expressed by the present invention to a method, an apparatus, a system, and so on is also valid as an embodiment of the present invention.

Hereinafter, the present invention will be described based on some embodiments with reference to the drawings. Identical or equivalent constituent elements, members, and processes illustrated in the drawings are given identical reference characters, and duplicate descriptions thereof will be omitted, as appropriate. The embodiments are illustrative in nature and are not intended to limit the invention. Not all the features and combinations thereof described in the embodiments are necessarily essential to the invention.

First Embodiment

An optical unit that includes a lens unit according to the present embodiment can be used in various vehicle lamps. First, an overview of a vehicle headlamp to which the optical unit according to the embodiment described later can be mounted will be given.

(Vehicle Headlamp)

Figure 2:
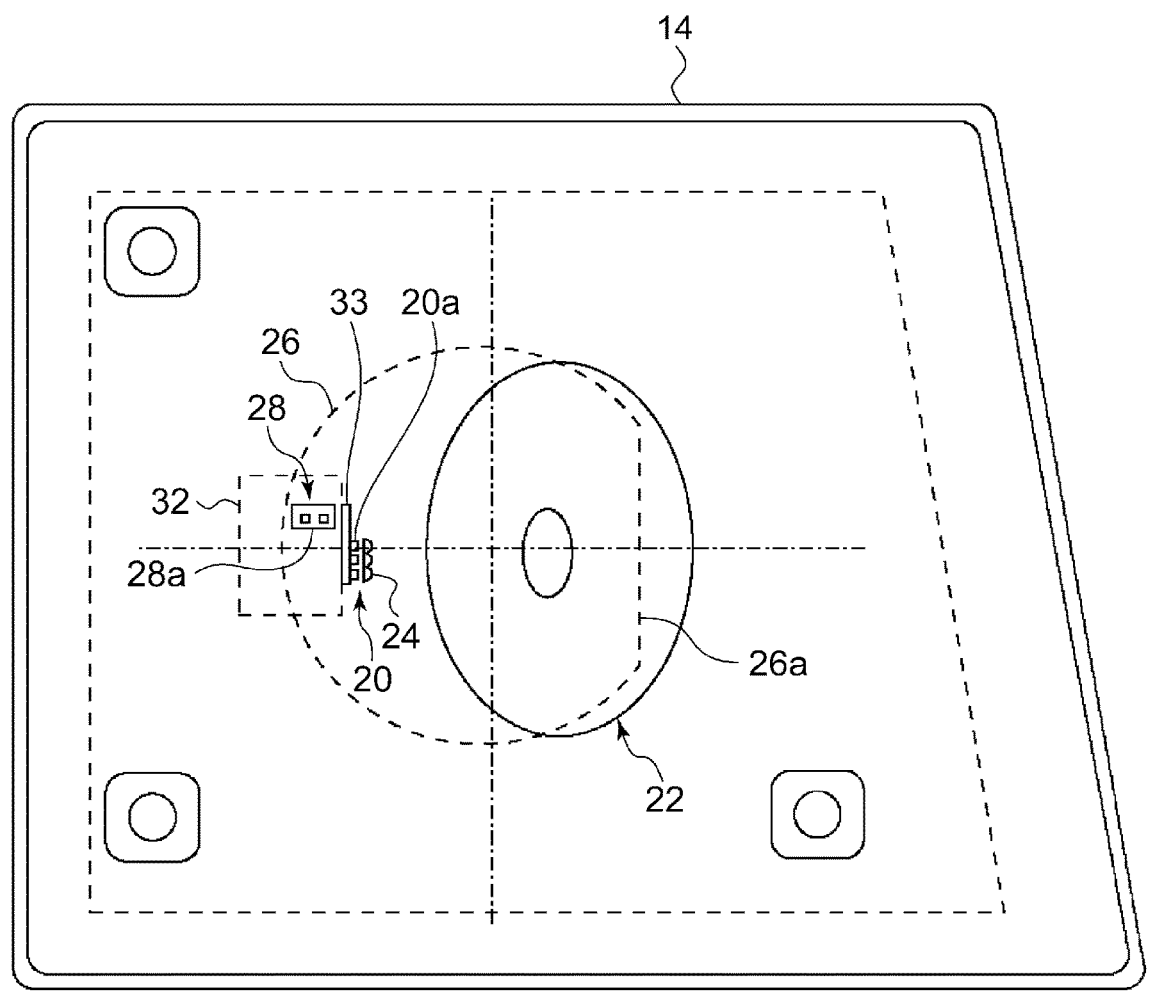
FIG. 2 is a front view of a vehicle headlamp according to an embodiment.

FIG. 1 is a schematic horizontal sectional view of a vehicle headlamp according to the present embodiment. FIG. 2 is a front view of the vehicle headlamp according to the present embodiment. FIG. 2 omits some of the components.

A vehicle headlamp 10 according to the present embodiment is a right-side headlamp to be mounted in a front right part of an automobile and has a structure identical to the structure of a headlamp to be mounted in the left side except that these headlamps are horizontally symmetric. Therefore, the right-side vehicle headlamp 10 will be described below in detail, and the description of the left-side vehicle headlamp will be omitted.

As illustrated in FIG. 1, the vehicle headlamp 10 includes a lamp body 12 having a concave portion that opens out to the front side of the vehicle headlamp 10. The front opening of the lamp body 12 is covered by a transparent front cover 14 to form a lamp room 16. The lamp room 16 functions as a space that houses one optical unit 18. The optical unit 18 is a lamp unit configured to be capable of emitting a variable high beam. A variable high beam refers to a high beam that has been so controlled as to change the shape of a high-beam light distribution pattern. For example, the variable high beam can produce a non-illumination region (shaded portion) in a portion of a light distribution pattern. In this example, a light distribution pattern corresponds to an illumination region that a lamp forms on a screen (virtual screen) placed twenty five meters to fifty meters in front of the lamp.

The optical unit 18 according to the present embodiment includes a first light source 20, a condenser lens 24, a rotary reflector 22, a projection lens 26, a second light source 28, a diffuser lens 30, and a heat sink 32. The condenser lens 24 serves as a primary optical system (optical member) that changes an optical path of first light L1 emitted from the first light source 20 to direct the first light L1 toward blades 22a of the rotary reflector 22. The rotary reflector 22 rotates about an axis of rotation R while reflecting the first light L1. The convex lens 26 serves as a projection lens that projects the first light L1 reflected by the rotary reflector 22 into a light illuminating direction (the right direction in FIG. 1) of the optical unit. The second light source 28 is disposed between the first light source 20 and the convex lens 26. The diffuser lens 30 serves as a primary optical system (optical member) that changes an optical path of second light L2 emitted from the second light source 28 to direct the second light L2 toward the convex lens 26. The heat sink 32 has the first light source 20 and the second light source 28 mounted thereon.

A semiconductor light emitting element, such as an LED, an EL, or an LD, is used for each light source. The first light source 20 according to the present embodiment includes a plurality of LEDs 20a disposed in an array on a circuit board 33. Each LED 20a can be turned on or off individually.

The second light source 28 according to the present embodiment includes two LEDs 28a disposed in an array and next to each other in the horizontal direction. Each LED 28a can be turned on or off individually. The second light source 28 is disposed such that the second light L2 enters the convex lens 26 without being reflected by the rotary reflector 22. With this configuration, the optical characteristics of the second light source 28 can be selected without taking into consideration that the second light L2 emitted from the second light source 28 could be reflected by the rotary reflector 22. Therefore, for example, when the light emitted from the second light source 28 is made to enter the convex lens 26 after being diffused by the diffuser lens 30, the resulting light can illuminate a greater range. Hence, the second light source 28 can be used as a light source for illuminating outward regions of the vehicle.

The rotary reflector 22 rotates by a driving source, such as a motor 34, and rotates in one direction about the axis of rotation R. The rotary reflector 22 includes two blades 22a having an identical shape, and the blades 22a are provided on a periphery of a rotary portion 22b. The blades 22a function as a reflective surface configured to reflect the light emitted from the first light source 20 while rotating and to scan a space in front of the vehicle with the reflected light to form a desired light distribution pattern.

The axis of rotation R of the rotary reflector 22 is inclined relative to an optical axis Ax and lies within a plane that includes the optical axis Ax and the first light source 20. In other words, the axis of rotation R extends substantially parallel to a scanning plane of the light (illumination beams) from the LEDs 20a that scans in the right-left direction as the rotary reflector 22 rotates. This configuration can reduce the thickness of the optical unit. In this example, the scanning plane can be seen, for example, as a fan-shaped plane formed by continuously connecting trajectories of the light, serving as the scanning light, emitted from the LEDs 20a.

The shape of the convex lens 26 can be selected as appropriate in accordance with the required light distribution characteristics, such as the required light distribution pattern or the required luminous intensity distribution. An aspherical lens or a free-form surface lens can be used as the convex lens 26. For example, when each light source and the rotary reflector 22 are arranged in a certain way, the convex lens 26 according to the present embodiment can have cut-out portion 26a where a part of the outer periphery of the convex lens 26 is cut out in the vertical direction. Then, the size of the optical unit 18 in the widthwise direction of the vehicle can be reduced.

Moreover, the presence of the cut-out portion 26a makes the blades 22a of the rotary reflector 22 less likely to interfere with the convex lens 26, and the distance between the convex lens 26 and the rotary reflector 22 can be reduced. The presence of a non-circular (i.e., linear) portion formed in the outer periphery of the convex lens 26 when the vehicle headlamp 10 is viewed toward its front side can help achieve a vehicle headlamp having an innovative design that is provided with a lens having an outline consisting of a combination of a curved line and a straight line as viewed toward the front of the vehicle.

(Light Distribution Pattern)

Figure 3:
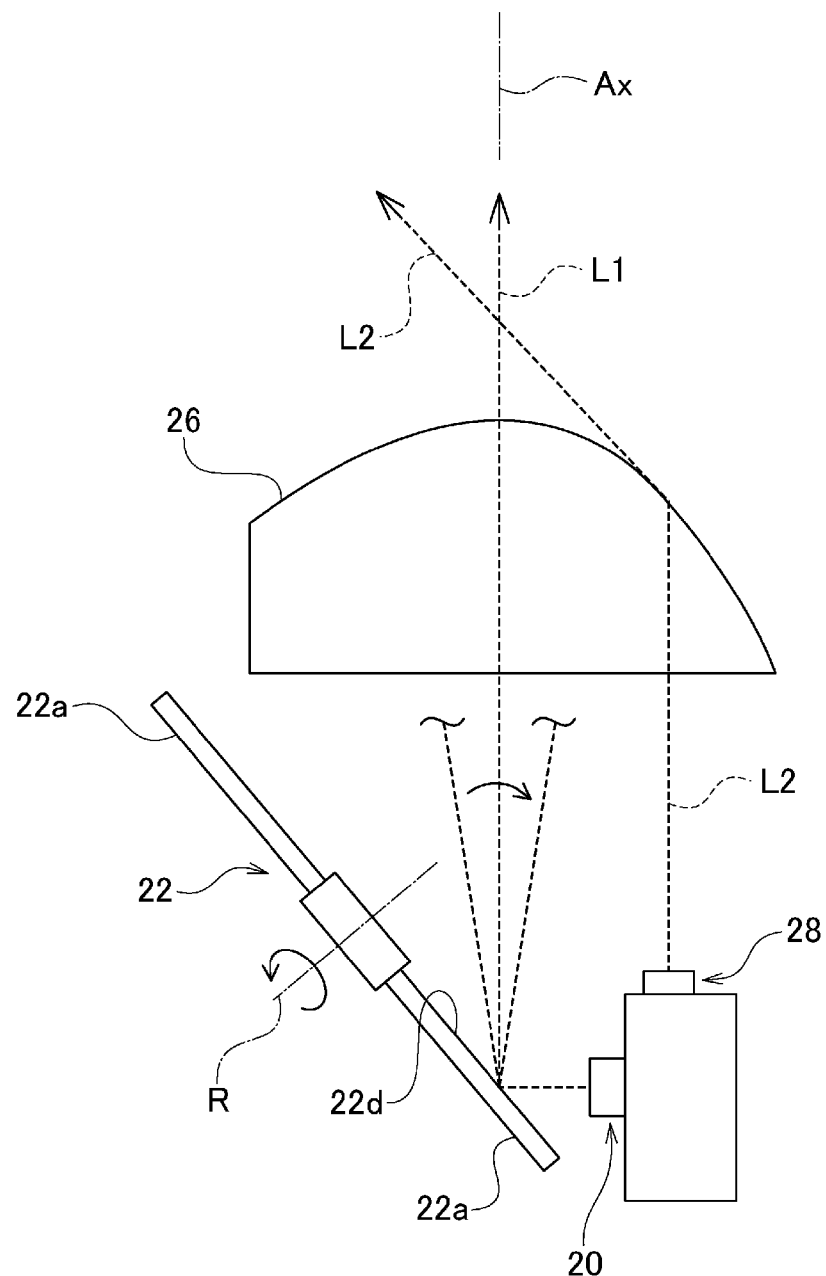
FIG. 3 schematically illustrates optical paths of exit lights in an optical unit according to an embodiment.
Figure 4:
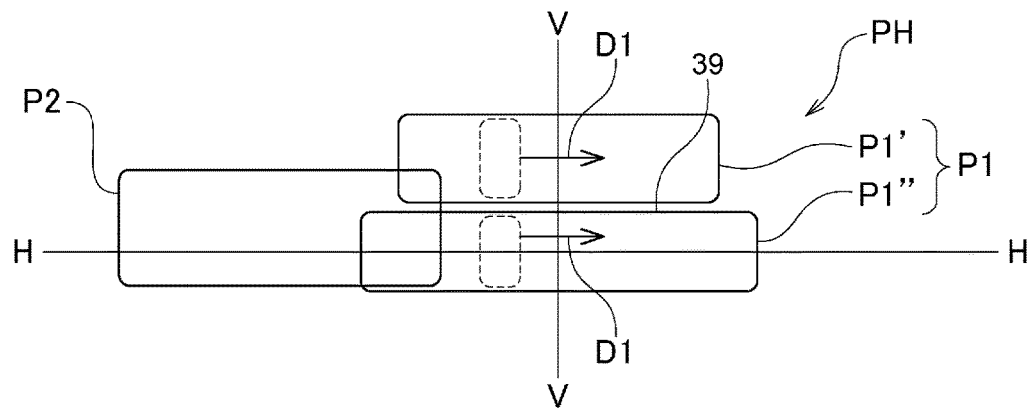
FIG. 4 is a schematic diagram of a light distribution pattern formed by an optical unit according to an embodiment.

FIG. 3 schematically illustrates optical paths of exit lights in the optical unit according to the present embodiment. FIG. 4 is a schematic diagram of a light distribution pattern formed by the optical unit according to the present embodiment.

As illustrated in FIG. 3, the first light L1 emitted from the first light source 20 of the optical unit 18 according to the present embodiment is reflected by the rotary reflector 22 that rotates about the axis of rotation R. A reflective surface 22d of each blade 22a of the rotary reflector 22 has a twisted shape in which an angle formed by the optical axis Ax and the corresponding reflective surface changes along the circumferential direction centered on the axis of rotation R. With this configuration, the blades 22a function as a reflective surface configured to scan a space in front of the vehicle with the first light emitted from the first light source 20 and reflected by the rotating blades 22a to form desired first light distribution patterns P1' and P1".

The light distribution pattern P1' illustrated in FIG. 4 is formed as the light emitted from one or more of the LEDs 20a included in the first light source 20 is scanned, and the light distribution pattern P1" is formed as the light emitted from the remaining LEDs 20a included in the first light source 20 is scanned.

The second light L2 emitted from the second light source 28 enters an end portion (a region away from the optical axis Ax) of the convex lens 26 without being reflected by the rotary reflector 22. The normal to an exit surface at the end portion of the convex lens 26 is inclined greatly relative to the optical axis Ax. Therefore, the second light L2 that passes through the end portion of the convex lens 26 is refracted greatly and forms a second light distribution pattern P2 on the left of the first light distribution patterns P1' and P1" (may also be referred to below as a "first light distribution pattern P1" as appropriate), as illustrated in FIG. 4.

In this manner, the optical unit 18 according to the present embodiment forms a high-beam light distribution pattern PH by superposing the first light distribution pattern P1 and the second light distribution pattern P2 on each other. When a light distribution pattern is formed with the light emitted from a plurality of light sources (light emitting elements) in this manner, the following issues need to be considered.

(1) When the plurality of LEDs 20a included in the first light source 20 form the plurality of light distribution patterns P1' and P1" in a direction (the direction along the V-V line) intersecting with the scanning direction (the direction of the arrows D1 indicated in FIG. 4) of the first light L1, a non-luminous portion in a gap between the LEDs 20a is projected as a dark portion.

(2) The second light distribution pattern P2 is an unmodified projection of a light source image of the second light source 28, and thus the boundary of the light distribution pattern is clear. Therefore, the boundary of the second light distribution pattern P2 is salient in the region where the second light distribution pattern P2 overlaps the first light distribution pattern P1, and this may cause a sense of discomfort in the driver.

(Projection Lens)

The present inventor has found that one way to mitigate the phenomena in (1) and (2) above is by diffusing (blurring) each light distribution pattern and paid a close attention to a projection lens as a component for achieving this effect.

Figure 5:
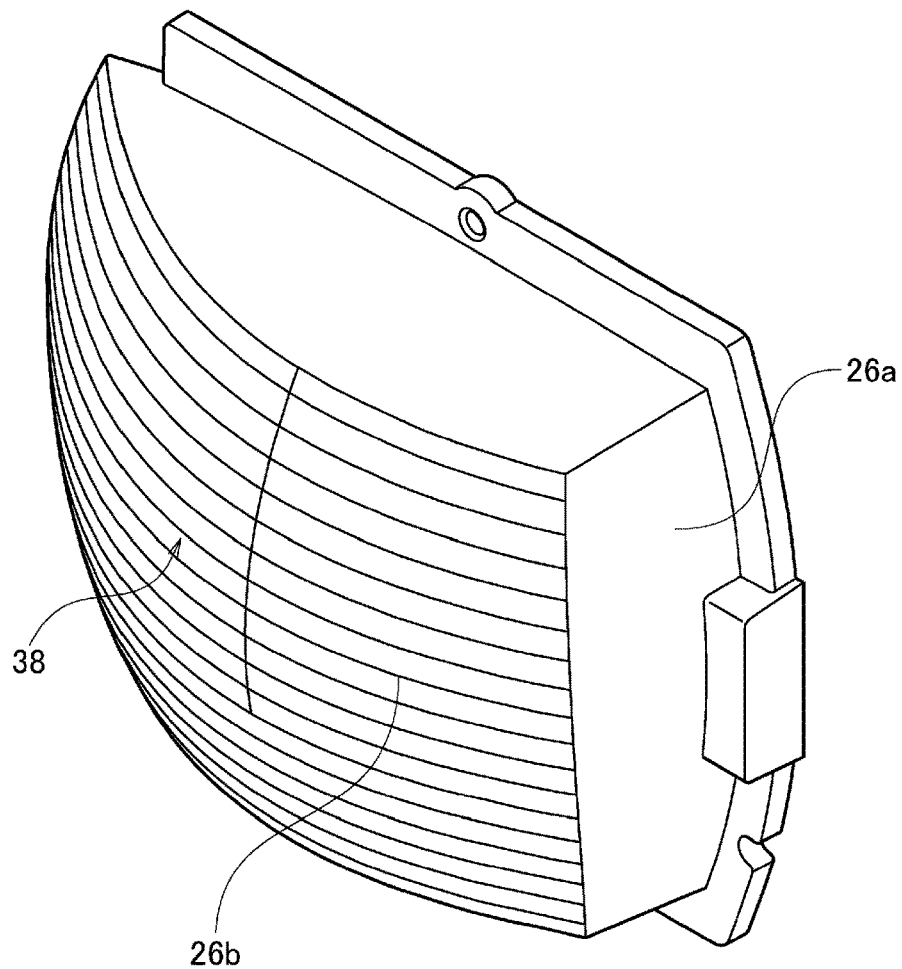
FIG. 5 is a perspective view of a convex lens according to an embodiment.
Figure 6:
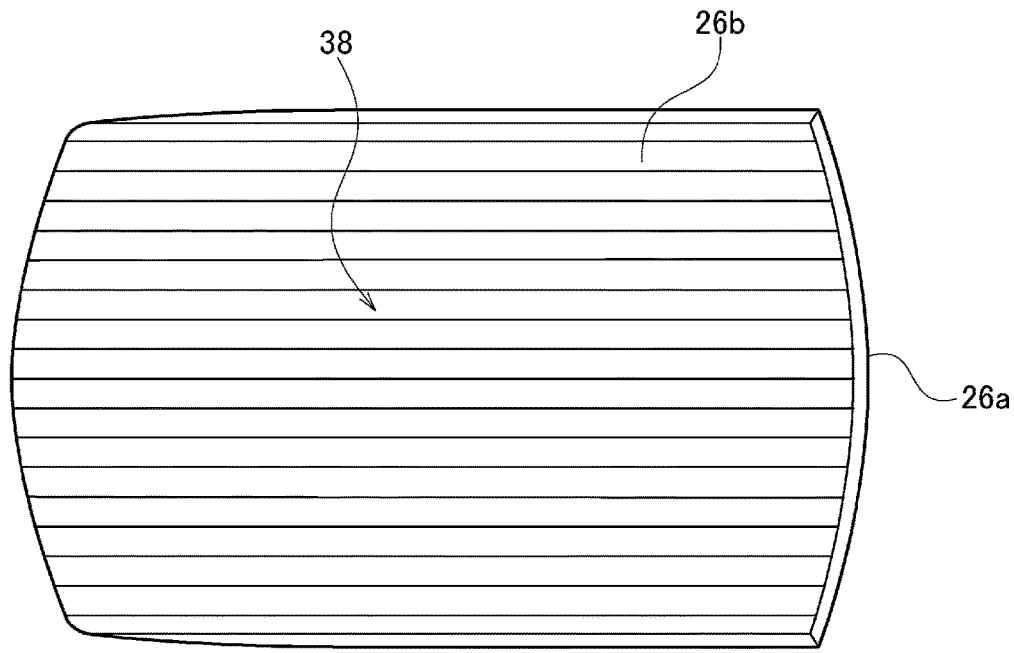
FIG. 6 is a front view of the convex lens illustrated in FIG. 5, showing its exit surface.
Figure 7:
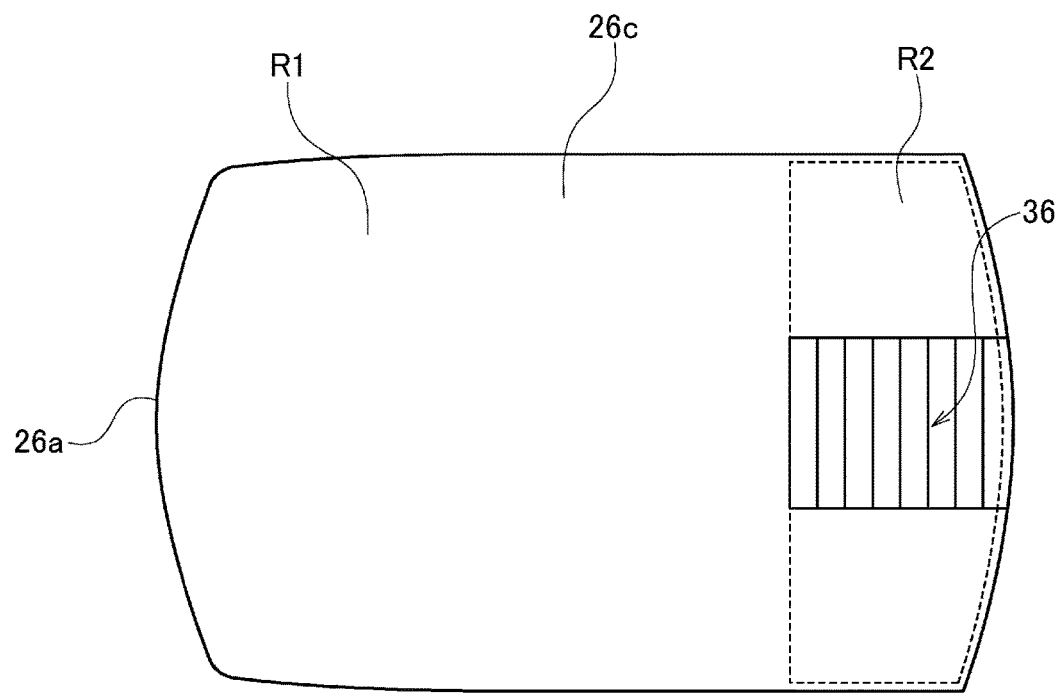
FIG. 7 is a rear view of the convex lens illustrated in FIG. 5, showing its entry surface.

Accordingly, a projection lens according to the present embodiment will be described. FIG. 5 is a perspective view of the convex lens 26 according to the present embodiment. FIG. 6 is a front view of the convex lens 26 illustrated in FIG. 5, showing its exit surface. FIG. 7 is a rear view of the convex lens 26 illustrated in FIG. 5, showing its entry surface.

The convex lens 26 includes a convex exit surface 26b and a substantially flat entry surface 26c. As described above, the convex lens 26 projects the second light distribution pattern P2 such that the second light distribution pattern P2 overlaps an end portion of the first light distribution pattern P1 in the right-left direction. A horizontally diffusing portion 36 is formed in a portion of the convex lens 26, and the horizontally diffusing portion 36 diffuses the second light L2 mainly in the right-left direction (the right-left direction of the convex lens 26 illustrated in FIGS. 6 and 7).

The horizontally diffusing portion 36 according to the present embodiment is what can be called a diffusing step that is located in the entry surface 26c of the convex lens 26 and that the second light L2 emitted from the second light source 28 enters. The pitch of the step is about 3 mm to about 5 mm. Although the horizontally diffusing portion 36 according to the present embodiment is a diffusing step formed in the entry surface 26c, a horizontally diffusing portion may instead be formed inside the convex lens 26. The horizontally diffusing portion 36 may be formed by forming a wave pattern or an embossed pattern in a predetermined region of the entry surface 26c, instead of by forming the diffusing step.

The horizontally diffusing portion 36 formed in a portion of the convex lens 26 can diffuse, in the right-left direction, the second light L2 projected as the second light distribution pattern P2 that overlaps an end portion of the first light distribution pattern P1 in the right-left direction. This can make the boundary of the second light distribution pattern P2 less salient in the portion where the first light distribution pattern P1 and the second light distribution pattern P2 overlap each other.

The entry surface 26c of the convex lens 26 includes a first entry region R1 that the first light L1 enters and a second entry region R2 that the second light L2 enters. The second entry region R2 according to the present embodiment has the horizontally diffusing portion 36 formed therein, whereas the first entry region R1 has no horizontally diffusing portion formed therein. This configuration allows the first light distribution pattern P1 and the second light distribution pattern P2 to be diffused in different manners. The first light entry region R1 according to the present embodiment is a non-diffusing portion, and the first light distribution pattern P1 can be diffused only in the up-down direction.

The horizontally diffusing portion 36 according to the present embodiment is formed in a partial region that has a smaller area than the second entry region R2. This configuration can lessen any decrease in the luminous intensity of the second light distribution pattern P2 associated with the diffusion, as compared to the case where the horizontally diffusing portion is formed in the entire second entry region R2.

The first light L1 and the second light L2 exit from the convex lens 26 via the exit surface 26b. The exit surface 26b includes a vertically diffusing portion 38 formed in the entire surface of the exit surface 26b. The vertically diffusing portion 38 diffuses the first light L1 and the second light L2 mainly in the up-down direction. With this configuration, the first light distribution pattern P1 as a whole is diffused in the up-down direction, and this makes a dark portion 39 between the first light distribution pattern P1' and the first light distribution pattern P1" less salient.

The vertically diffusing portion 38 according to the present embodiment is formed in the entire surface of the exit surface 26b of the convex lens 26 and is what can be called a diffusing step via which the first light L1 and the second light L2 exit the convex lens 26. The pitch of the step is about 1 mm to about 3 mm. Although the vertically diffusing portion 38 according to the present embodiment is a diffusing step formed in the exit surface 26b, a vertically diffusing portion may instead be formed inside the convex lens 26. The vertically diffusing portion 38 may be formed by forming a wave pattern or an embossed pattern in a predetermined region of the exit surface 26b, instead of by forming the diffusing step.

The convex lens 26 according to the present embodiment can diffuse the light passing therethrough in different manners in the up-down direction and in the right-left direction depending on which region the light passes through, as the vertically diffusing portion 38 is formed in the exit surface 26b and the horizontally diffusing portion 36 is formed in the entry surface 26c. The first light L1 is diffused only in the up-down direction by the vertically diffusing portion 38 and is not diffused in the right-left direction. Therefore, any decrease in the luminous intensity of the first light distribution pattern P1 associated with the diffusion can be lessened.

Second Embodiment (Vehicle Headlamp)

Figure 8:
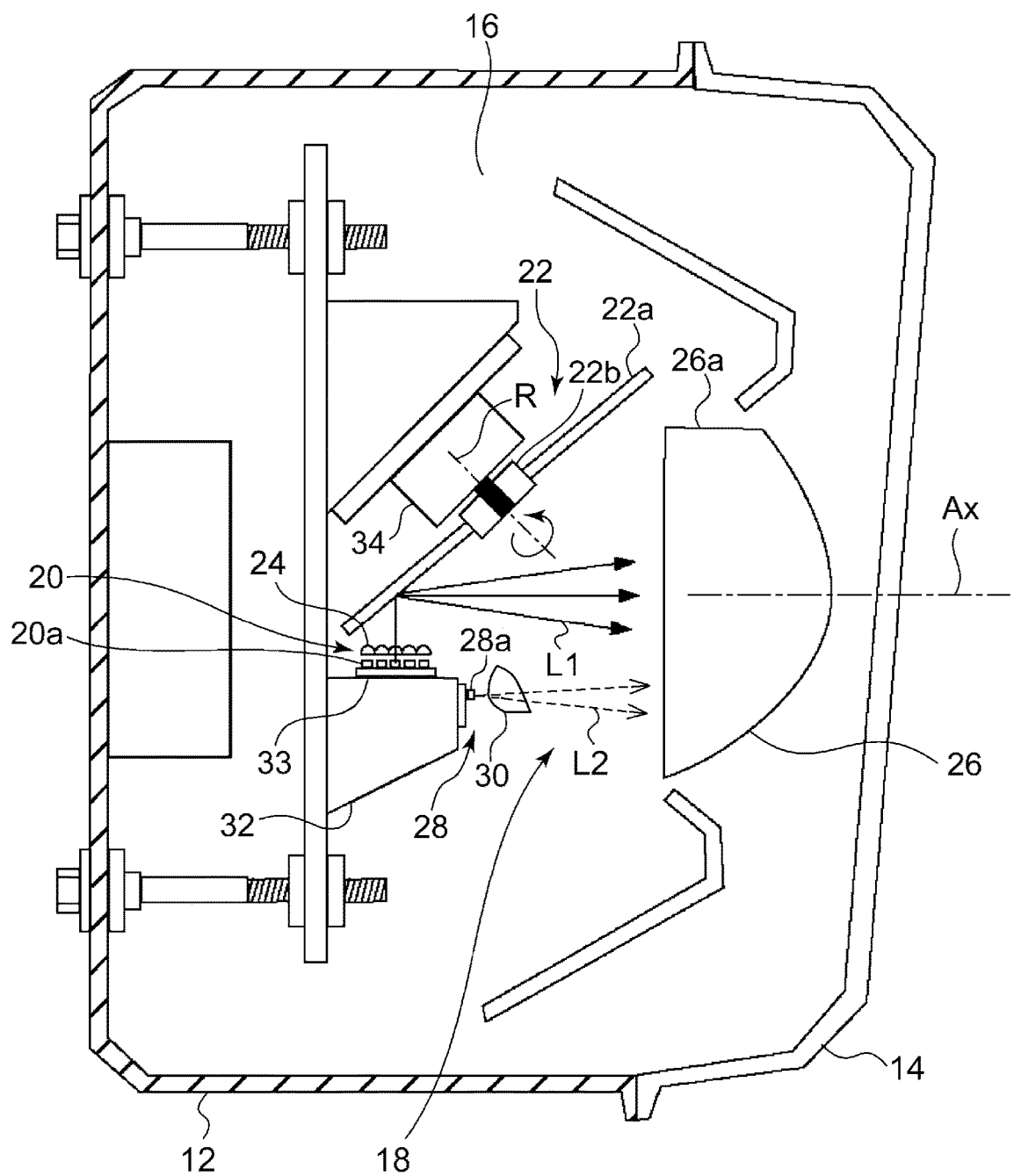
FIG. 8 is a schematic horizontal sectional view of a vehicle headlamp according to an embodiment.
Figure 9:
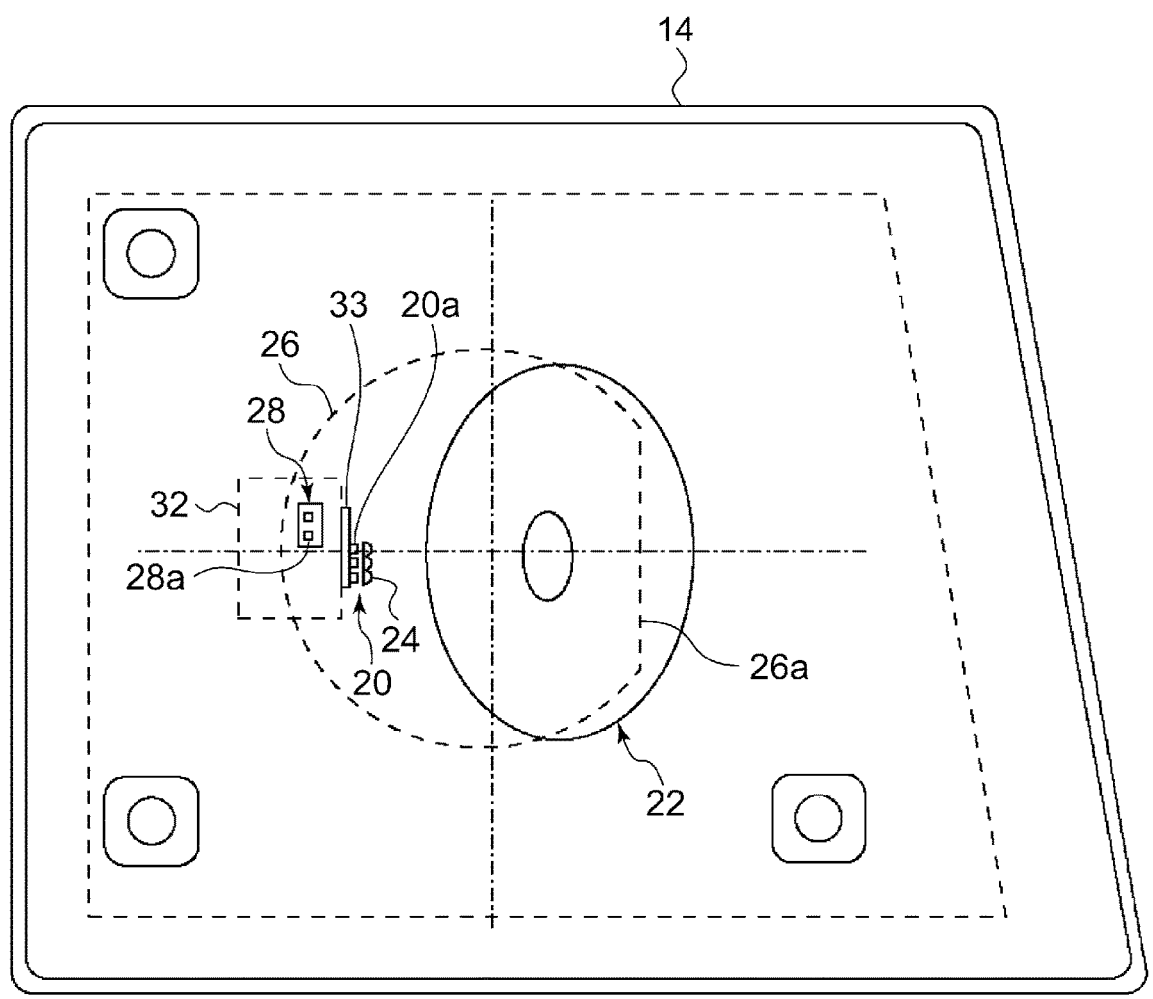
FIG. 9 is a front view of a vehicle headlamp according to an embodiment.

FIG. 8 is a schematic horizontal sectional view of a vehicle headlamp according to the present embodiment. FIG. 9 is a front view of the vehicle headlamp according to the present embodiment. FIG. 9 omits some of the components. The vehicle headlamp according to the present embodiment illustrated in FIGS. 8 and 9 differs from the vehicle headlamp according to the first embodiment in that two LEDs 28a of the second light source 28 are disposed in an array and next to each other in the vertical direction. Thus, the detailed description of the vehicle headlamp illustrated in FIGS. 8 and 9 will be omitted.

(Light Distribution Pattern)

Figure 10:
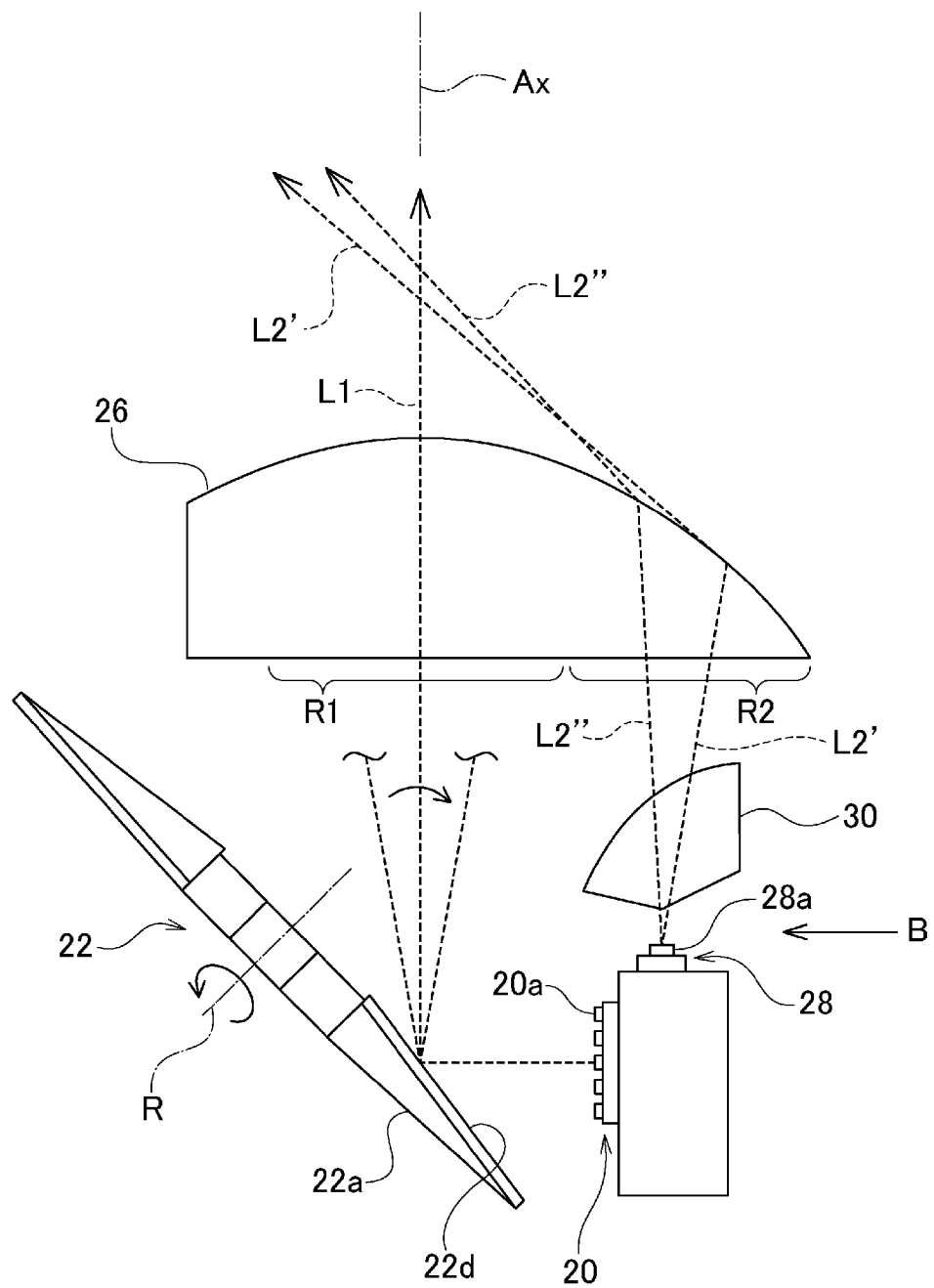
FIG. 10 schematically illustrates optical paths of exit lights in an optical unit according to an embodiment.
Figure 11:
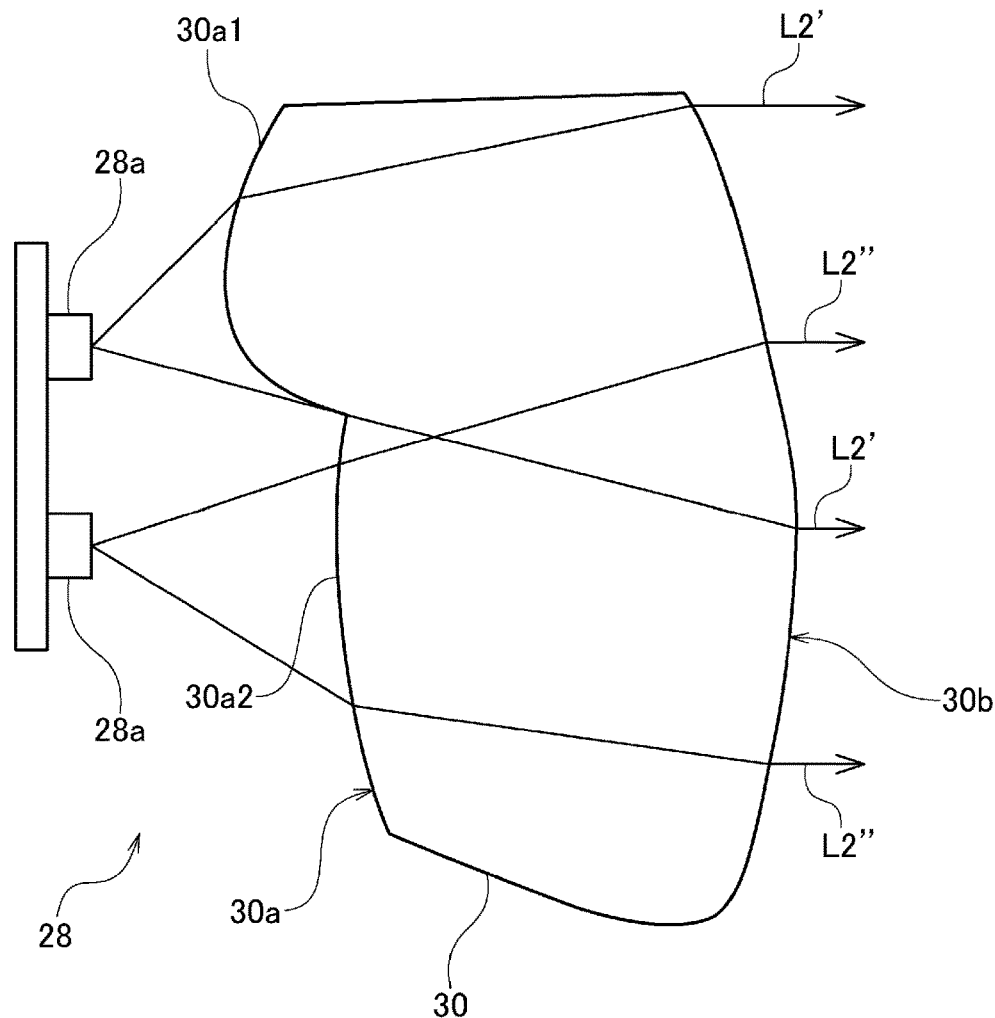
FIG. 11 is a schematic diagram looking in the direction of the arrow B indicated in FIG. 10.
Figure 12:
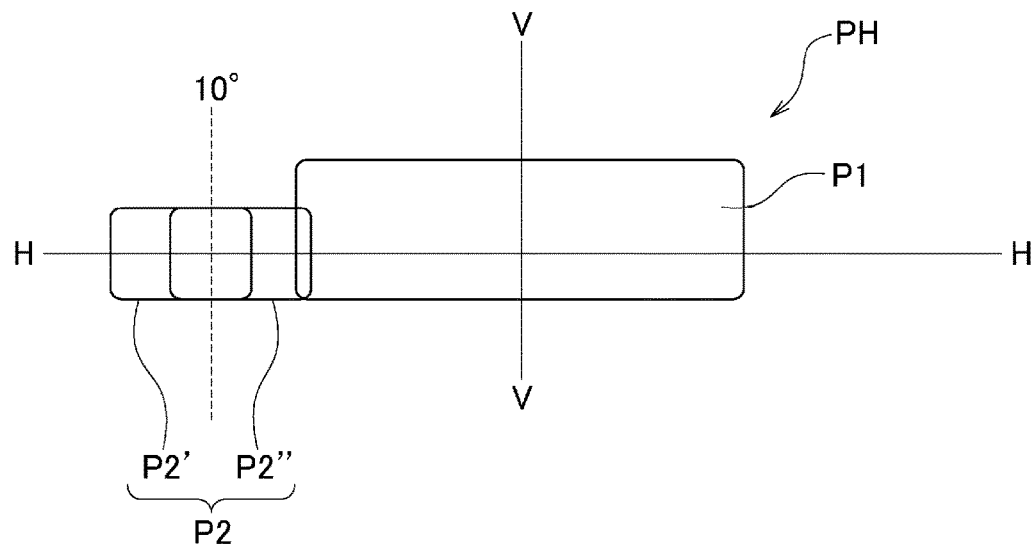
FIG. 12 is a schematic diagram of a light distribution pattern formed by an optical unit according to an embodiment.

FIG. 10 schematically illustrates optical paths of exit lights in an optical unit according to the present embodiment. FIG. 11 is a schematic diagram looking in the direction of the arrow B indicated in FIG. 10. FIG. 12 is a schematic diagram of a light distribution pattern formed by the optical unit according to the present embodiment.

As illustrated in FIG. 10, the first light L1 emitted from the first light source 20 of the optical unit 18 according to the present embodiment is reflected by the rotary reflector 22 that rotates about the axis of rotation R. The reflective surface 22d of each blade 22a of the rotary reflector 22 has a twisted shape in which the angle formed by the optical axis Ax and the corresponding reflective surface changes along the circumferential direction centered on the axis of rotation R. With this configuration, the blades 22a function as a reflective surface configured to scan a space in front of the vehicle with the first light L1 emitted from the first light source 20 and reflected by the rotating blades 22a to form a desired first light distribution pattern P1. The light distribution pattern P1 illustrated in FIG. 12 is formed as the light emitted from one or more of the LEDs 20a included in the first light source 20 is scanned.

The diffuser lens 30 is disposed in front of the light emitting surfaces of the two LEDs 28a arrayed in the up-down direction in the second light source 28 according to the present embodiment. The second light source 28 is disposed such that second lights L2' and L2" transmitted through the diffuser lens 30 enter the convex lens 26 via the second entry region R2 that lies to the outer side of the first entry region R1 via which the first light L1 enters the convex lens 26. This configuration allows the second light distribution pattern P2 to be projected in a region on the outer side of the first light distribution pattern P1 in the right-left direction.

The diffuser lens 30 is an optical member that controls the optical path of each LED 28a so as to form the second light distribution pattern P2 that is a diffused light distribution pattern. As illustrated in FIG. 11, the diffuser lens 30 includes an entry surface 30a and an exit surface 30b serving as control surfaces that each control separately the optical paths of the second lights L2' and L2" emitted from the respective LEDs 28a. This configuration makes it possible to control separately the optical paths of the plurality of LEDs 28a with the single diffuser lens 30.

The entry surface 30a includes a first light controlling surface 30a1 and a second light controlling surface 30a2. The first light controlling surface 30a1 receives the second light L2' emitted from the LED 28a that is located in the upper side in the second light source 28, and the second light controlling surface 30a2 receives the second light L2" emitted from the LED 28a that is located in the lower side in the second light source 28. This configuration makes it possible to control separately the optical paths of the second lights L2' and L2" emitted from the plurality of LEDs 28a. The first light controlling surface 30a1 and the second light controlling surface 30a2 are disposed next to each other in the up-down direction. Therefore, the width of the optical unit 18 can be reduced, for example.

The exit surface 30b according to the present embodiment is a continuous third light controlling surface via which both the second light L2' that has entered the diffuser lens 30 via the first light controlling surface 30a1 and the second light L2" that has entered the diffuser lens 30 via the second light controlling surface 30a2 exit the diffuser lens 30. With this configuration, both the second light L2' that has entered the diffuser lens 30 via the first light controlling surface 30a1 and the second light L2" that has entered the diffuser lens 30 via the second light controlling surface 30a2 exit the diffuser lens 30 via the third light controlling surface serving as the common exit surface 30b, and this makes it simpler to design the exit surface 30b.

The second lights L2' and L2" emitted from the second light source 28 enter an end portion (a region away from the optical axis Ax) of the convex lens 26 without being reflected by the rotary reflector 22. The normal to the exit surface at the end portion of the convex lens 26 is inclined greatly relative to the optical axis Ax. Therefore, the second lights L2' and L2" that pass through the end portion of the convex lens 26 are refracted greatly and form the second light distribution pattern P2 (P2' and P2") to the left of the first light distribution pattern P1, as illustrated in FIG. 12.

A partial light distribution pattern P2' constituting a part of the second light distribution pattern P2 is formed as the second light L2' emitted from the LED 28a disposed in the upper side in the second light source 28 is scanned. Meanwhile, a partial light distribution pattern P2" constituting another part of the second light distribution pattern P2 is formed as the second light L2" emitted from the LED 28a disposed in the lower side in the second light source 28 is scanned.

In this manner, the optical unit 18 according to the present embodiment includes the convex lens 26 and the diffuser lens 30. The convex lens 26 projects the first light L1 reflected by the rotary reflector 22 into the light illuminating direction (the front direction) of the optical unit to form the first light distribution pattern P1. The diffuser lens 30 deflects the optical paths of the second lights L2' and L2" emitted from the second light source 28 away from the rotary reflector 22 to direct these optical paths toward the convex lens 26.

The convex lens 26 projects the second lights L2' and L2" into the light illuminating direction (the front direction) of the optical unit to form the second light distribution pattern P2 such that the second light distribution pattern P2 illuminates a region on the outer side of the first light distribution pattern P1 in the right-left direction. The diffuser lens 30 is configured to form the second light distribution pattern P2 by superposing the partial light distribution pattern P2' and P2" formed by the respective element lights emitted from the plurality of LEDs 28a.

This configuration can help increase the maximum luminous intensity in a portion (a portion near 10° of the H-H line) where the partial light distribution pattern P2' and P2" overlap each other. In this manner, the diffuser lens 30 according to the present embodiment has a lens surface that is designed not to project the unmodified light source images of the plurality of LEDs 28a included in the second light source 28 but to superpose the projection images of the respective LEDs 28a.

Modification Examples

The optical unit 18 according to the foregoing embodiment includes the first light source 20 and the rotary reflector 22. Alternatively, an optical unit that includes neither the first light source 20 nor the rotary reflector 22 may instead be used. For example, an optical unit according to a modification example includes the second light source 28, the convex lens 26, and the diffuser lens 30. The second light source includes the plurality of LEDs 28a. The convex lens 26 projects the light emitted from the second light source 28 into the light illuminating direction of the optical unit to form a light distribution pattern. The diffuser lens 30 directs the optical paths of the second lights L2' and L2" emitted from the second light source 28 toward the convex lens 26. The diffuser lens 30 is configured to form the second light distribution pattern P2 by superposing the partial light distribution pattern P2' and P2" formed by the respective element lights emitted from the plurality of LEDs 28a. This configuration can help increase the maximum luminous intensity of the second light distribution pattern P2 even without any improvement in the performance of the LEDs 28a.

Third Embodiment (First Light Source)

Figure 13:
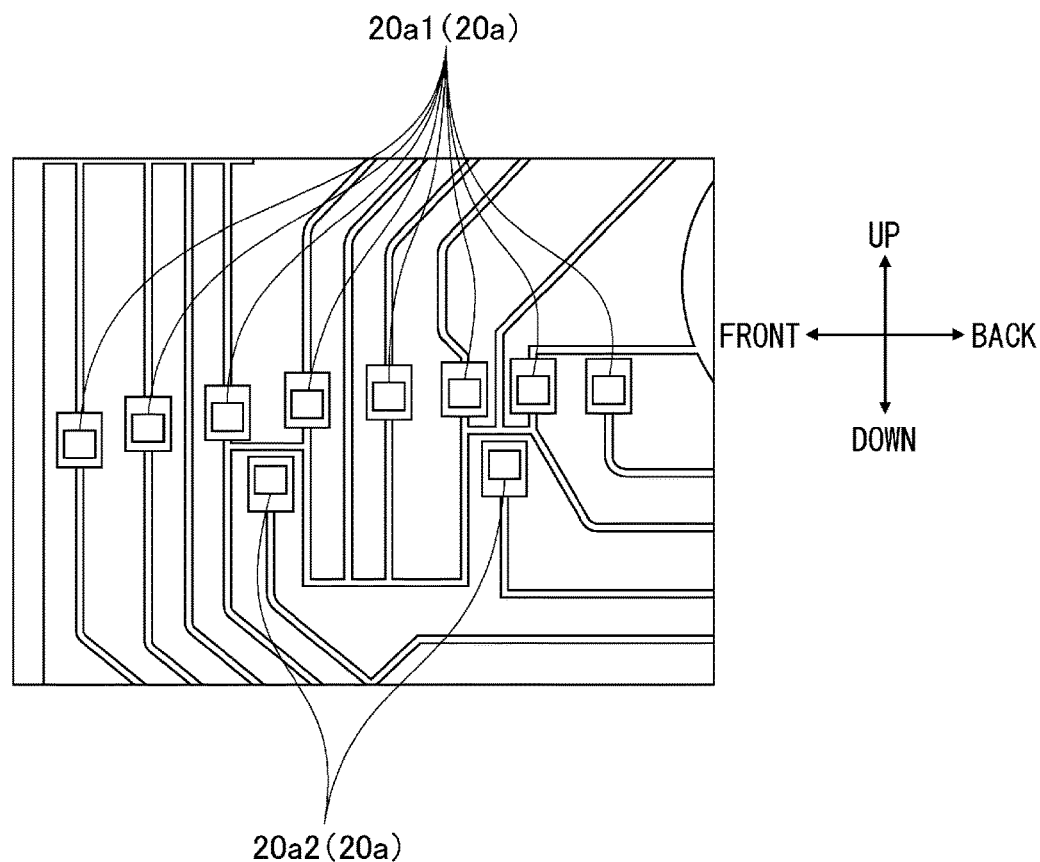
FIG. 13 is a top view of a circuit board according to an embodiment.

Next, a layout of a plurality of semiconductor light emitting elements included in a first light source will be described. FIG. 13 is a top view of a circuit board according to the present embodiment. The circuit board 33 according to the present embodiment has mounted thereon eight LEDs 20a1 (20a) that illuminate a region including the H-H line of a high-beam light distribution pattern and two LEDs 20a2 (20a) that illuminate a region above the H-H line. The up, down, front, and back directions indicated in FIG. 13 are defined with the direction of the optical axis Ax of the vehicle headlamp 10 regarded as the front direction.

(Optical Member)

Figure 14:
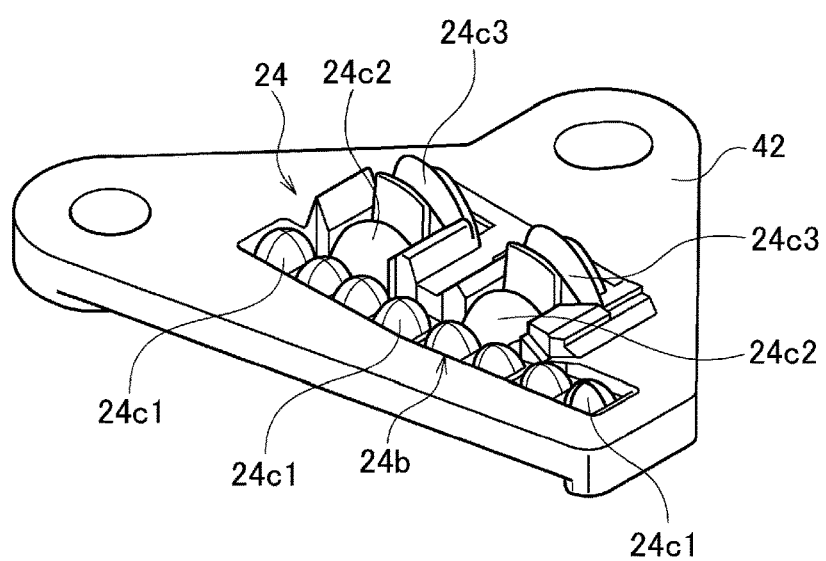
FIG. 14 is a perspective view of an optical member according to an embodiment.
Figure 15:
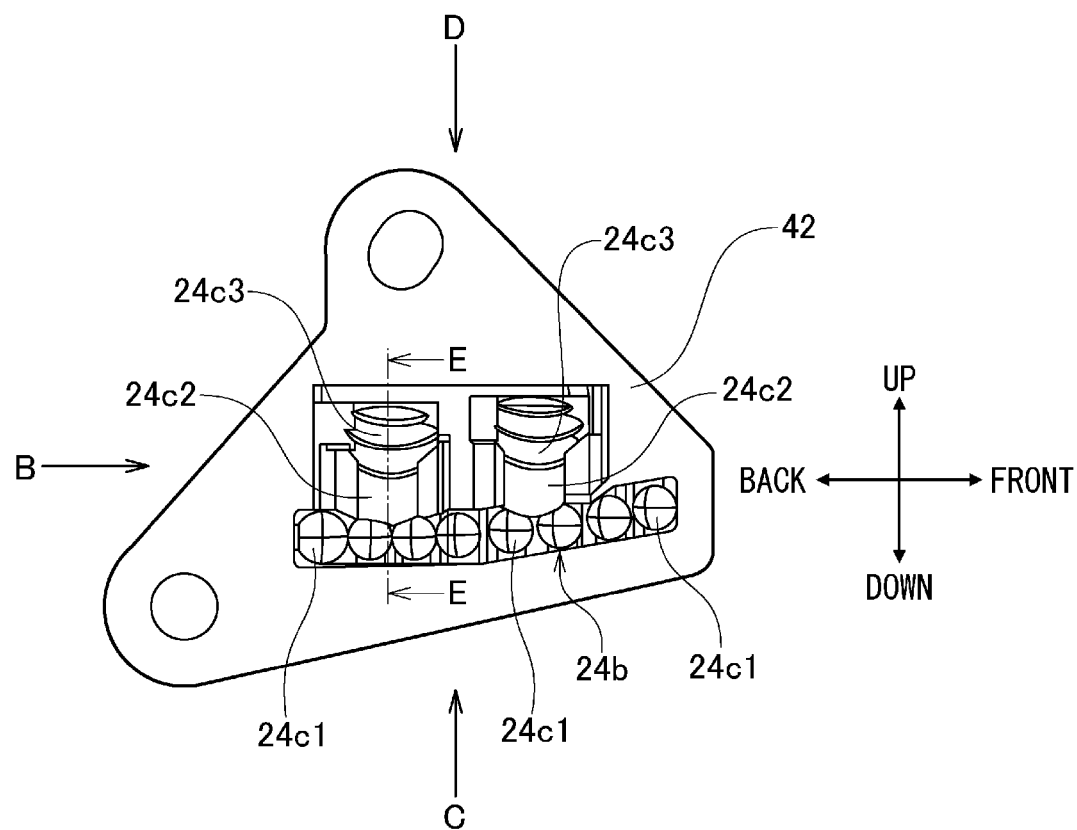
FIG. 15 is a front view of an optical member according to an embodiment.
Figure 16:
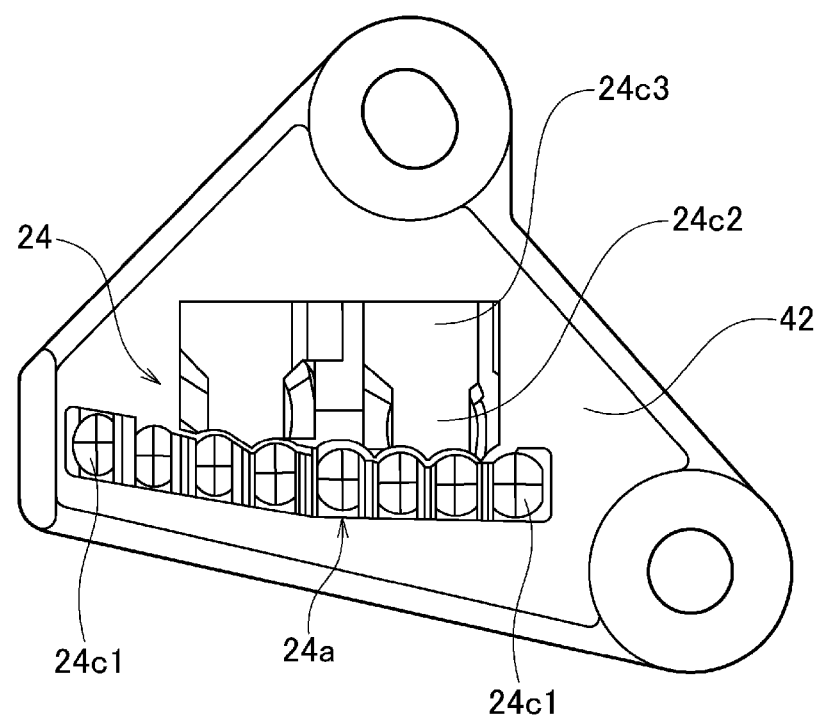
FIG. 16 is a rear view of an optical member according to an embodiment.
Figure 17:
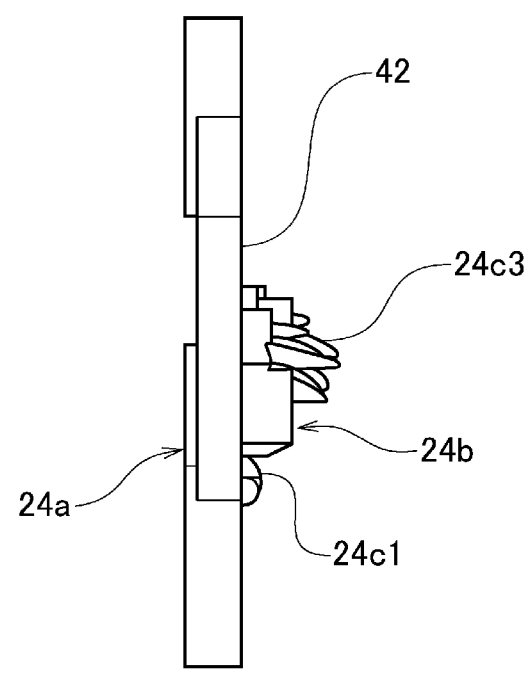
FIG. 17 is a side view of the optical member illustrated in FIG. 15, looking in the B direction.
Figure 18A:
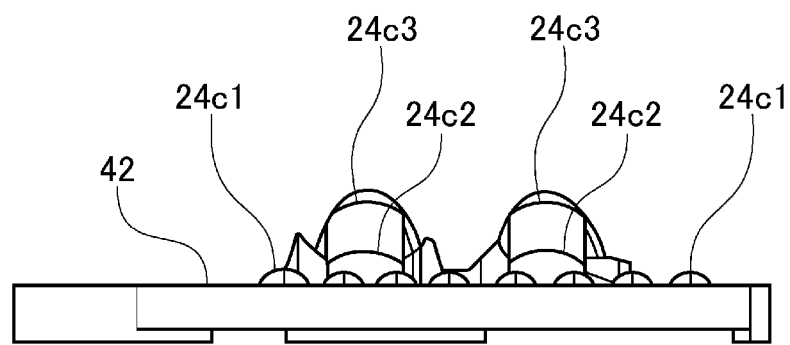
FIG. 18A is a side view of the optical member illustrated in FIG. 15, looking in the C direction.
Figure 18B:
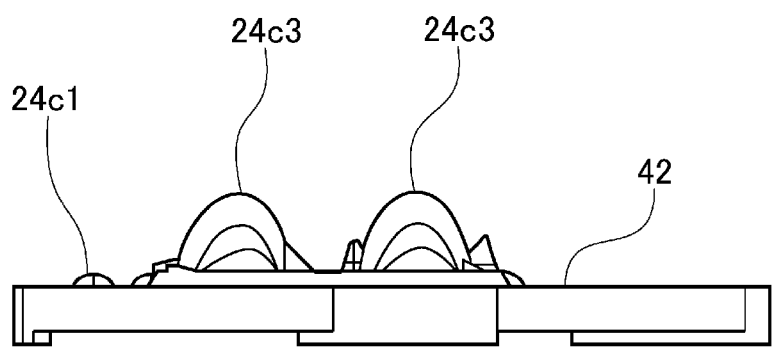
FIG. 18B is a side view of the optical member illustrated in FIG. 15, looking in the D direction.

Next, an optical member according to the present embodiment will be described. FIG. 14 is a perspective view of the optical member according to the present embodiment. FIG. 15 is a front view of the optical member according to the present embodiment. FIG. 16 is a rear view of the optical member according to the present embodiment. FIG. 17 is a side view of the optical member illustrated in FIG. 15, looking in the B direction. FIG. 18A is a side view of the optical member illustrated in FIG. 15, looking in the C direction. FIG. 18B is a side view of the optical member illustrated in FIG. 15, looking in the D direction. The up, down, front, and back directions indicated in FIG. 15 are defined with the direction of the optical axis Ax of the vehicle headlamp 10 regarded as the front direction.

An optical member 40 according to the present embodiment includes a condenser lens 24 and a plate-like base portion 42. The condenser lens 24 serves as an optical controller that controls the light that enters the optical member 40 via a back side 24a to cause the light to exit via a front side 24b. The base portion 42 is adjacent to the condenser lens 24. The condenser lens 24 includes eight lens portions 24c1 corresponding to the respective lights emitted from the eight LEDs 20a1 and two lens portions 24c2 corresponding to the respective lights emitted from the two LEDs 20a2. In this example, to control light means to direct the light in a desired pattern, direction, or region, for example.

The gap between the light emitting surface of the LEDs 20a and the entry surface of the condenser lens 24 according to the present embodiment is about 0.2 mm to about 1 mm or preferably about 0.2 mm to about 0.5 mm. The thickness of the base portion 42 is about 1 mm to about 5 mm or preferably about 2 mm to about 3 mm. The diameter of each dome-shaped lens portion 24c2 is about 2 mm to about 4 mm.

The lens portions 24c1 and 24c2 of the optical member 40 according to the present embodiment are each shaped to condense the light transmitted therethrough by refracting the light. The lens portions 24c1 according to the present embodiment are each convex at its back side 24a as well as at its front side 24b. The lens portions 24c2 each include an expanding lens portion 24c3, which will be described later. In the optical controller, a surface region of the front side 24b through which the light emitted from the LEDs 20a is transmitted to exit the optical controller functions as a light emitting surface of a pseudo-light source.

The optical member 40 according to the present embodiment is an injection molded component formed of a transparent material and can be formed of, for example but not limited to, heat-resistant silicone, acryl, polycarbonate, or glass. Preferably, heat-resistant silicone (can resist the heat of 180° C. or higher) or glass is used, from the standpoint of its heat-resistant property. From the standpoint of the design flexibility of the shape of the optical member, heat-resistant silicone is more preferable as it can be forcibly removed from a mold relatively easily. Thus, even when the optical member has a somewhat complex shape, the optical member can be manufactured with a simple mold configuration or through a simple manufacturing method.

(Expanding Lens Portion)

Figure 19:
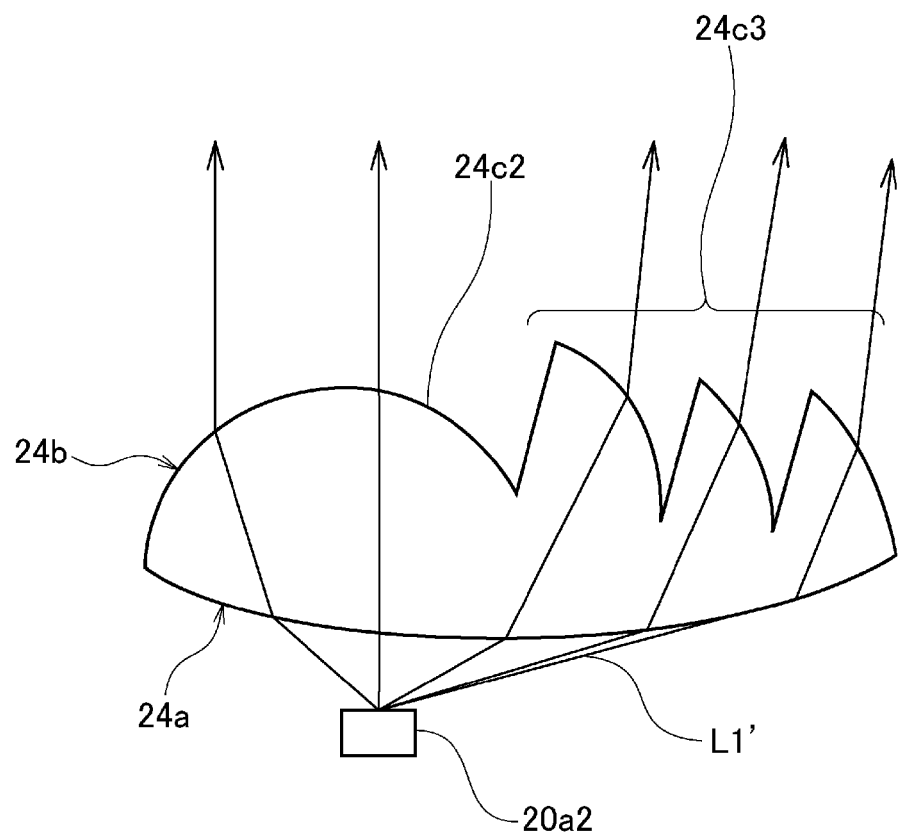
FIG. 19 is a sectional view of the optical member illustrated in FIG. 15, taken along the E-E line.

FIG. 19 is a sectional view of the optical member illustrated in FIG. 15, taken along the E-E line. The optical unit 18 according to the present embodiment includes the first light source 20, the optical member 40, and the convex lens 26. The plurality of LEDs 20a1 and 20a2 are disposed in an array in the first light source 20. The optical member 40 includes the plurality of lens portions 24c1 and 24c2 corresponding to the respective LEDs 20a1 and 20a2 and condenses the light emitted from the first light source 20. The convex lens 26 projects the light transmitted through the optical member 40 into the light illuminating direction of the optical unit to form a light distribution pattern.

At least one of the plurality of lenses included in the optical member 40 includes the condensing lens portion 24c2 and the expanding lens portion 24c3. The condensing lens portion 24c2 is located in front of the light emitting surface of the corresponding LED 20a2. The expanding lens portion 24c3 receives light L1' emitted diagonally from the light emitting surface of the corresponding LED 20a2 and causes the light L1' to travel in the front direction of the lens so as to expand a luminous region of the lens. As illustrated in FIG. 19, the expanding lens portion 24c3 according to the present embodiment is formed into a Fresnel lens. This configuration can help reduce the thickness of the expanding lens portion 24c3. The expanding lens portion 24c3 formed into a Fresnel lens according to the present embodiment has a longitudinal dimension of 3 mm to 5 mm and a lateral dimension of 3 mm to 5 mm as viewed from the front and has a height of about 3 mm to about 5 mm as viewed from the side.

(Light Distribution Pattern)

Figure 20A:
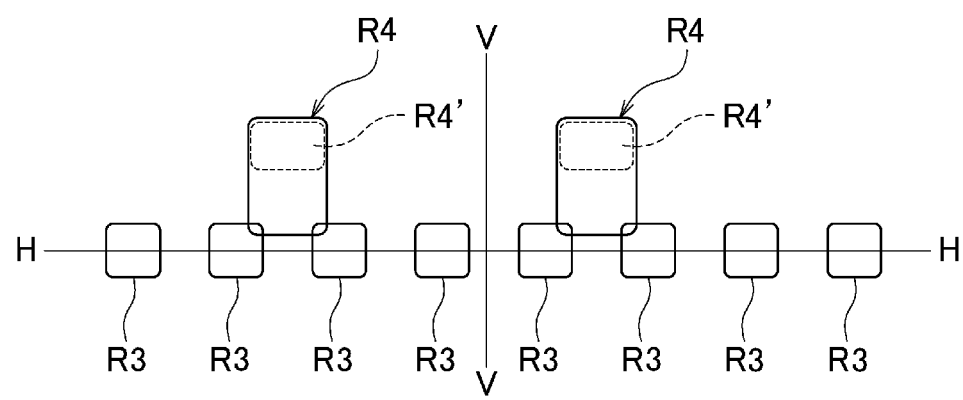
FIG. 20A is a schematic diagram illustrating an illumination range obtained when a luminous region of a first light source according to an embodiment is reflected and projected by a stationary rotary reflector.
Figure 20B:
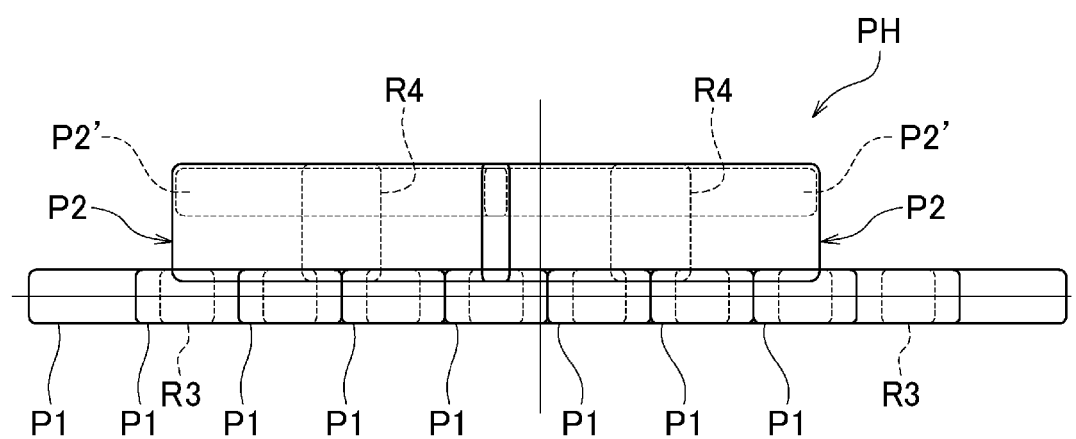
FIG. 20B is a schematic diagram of a light distribution pattern formed by an optical unit according to an embodiment.

FIG. 20A is a schematic diagram illustrating an illumination range obtained when a luminous region of the first light source according to the present embodiment is reflected and projected by a stationary rotary reflector. FIG. 20B is a schematic diagram of a light distribution pattern formed by the optical unit according to the present embodiment.

In the optical unit 18 according to the present embodiment, when all the LEDs 20a of the first light source 20 are turned on with the rotary reflector 22 kept from rotating, the surfaces of the eight lens portions 24c1 and the two lens portions 24c2 of the condenser lens 24 serve as a luminous region. Then, the surface of the stationary rotary reflector 22 reflects an image of the luminous region, and this image is projected into a space in front of the vehicle via the convex lens 26 (see FIG. 20A).

In the optical unit 18 according to the present embodiment, the eight lights that have exited the condenser lens 24 via the respective lens portions 24c1 form eight rectangular illumination regions R3 on the H-H line. The two lights that have exited the condenser lens 24 via the respective lens portions 24c2 and expanding lens portions 24c3 form two rectangular illumination regions R4 on the upper side of the illumination regions R3. The expanding lens portion 24c3 according to the present embodiment increase the size of the luminous region of the lens portions 24c2 in the vertical direction, and therefore the illumination regions R4 are each a rectangular region that is longer in the vertical direction.

If the condenser lens 24 includes only the lens portions 24c2, the light can illuminate only a range of up to +4 degrees in the vertical direction on the screen in front of the vehicle. In contrast, in the case of the condenser lens 24 that includes the expanding lens portions 24c3 according to the present embodiment, the light can illuminate a range of up to +6 degrees in the vertical direction on the screen in front of the vehicle. In this manner, the optical unit 18 according to the present embodiment can increase the size of the illumination region since the luminous region of the lens portions 24c2 is expanded in the vertical direction by the expanding lens portions 24c3.

When the rotary reflector 22 rotates, the illumination regions R3 and R4 are scanned in the right-left direction and form the respective partial light distribution patterns P1 and P2. In the present embodiment, the high-beam light distribution pattern PH is formed as the partial light distribution patterns P1 and P2 are superposed on each other.

In this manner, the rotary reflector 22 according to the present embodiment forms a part or the whole of the high-beam light distribution pattern PH by reflecting and scanning the pattern of the luminous region of the condenser lens 24.

The optical unit 18 according to the present embodiment forms upper regions P2' of the high-beam light distribution pattern PH by reflecting and scanning the patterns of the portions (regions R4'), among the luminous region of the condenser lens 24, that correspond to the expanding lens portions 24c3. This makes it possible to further increase the size of the illumination region of the high-beam light distribution pattern PH in the vertical direction.

The optical member 40 is disposed such that a virtual image of the luminous region of the condenser lens 24 formed by the rotary reflector 22 is located at or around the focal point of the convex lens 26. Alternatively, the optical member 40 may be disposed such that the luminous region of the condenser lens 24 is located at or around the focal point of the convex lens 26. This configuration allows the luminous region of the condenser lens 24 to be projected as a light source into the front direction of the convex lens 26.

Modification Examples

Figure 21:
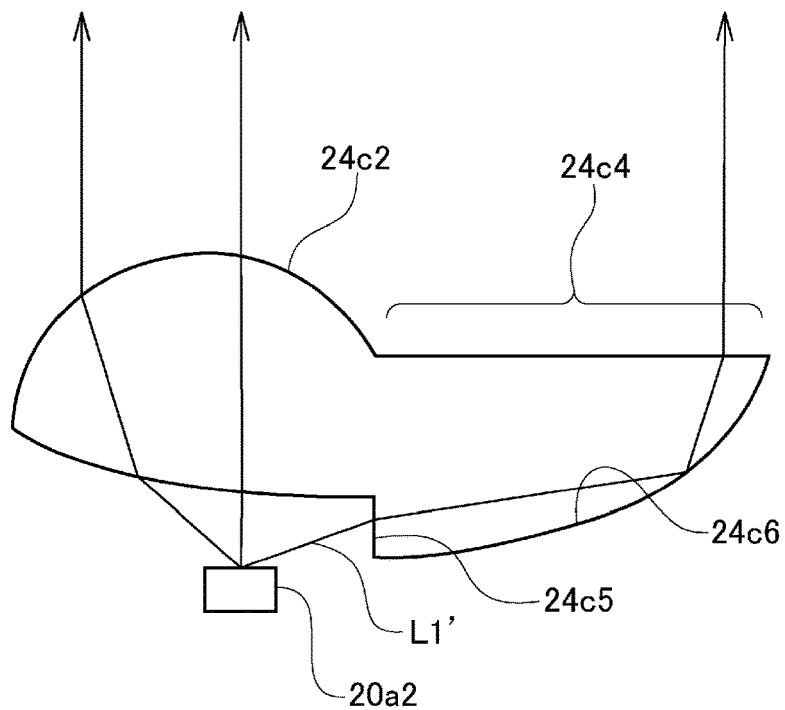
FIG. 21 is a sectional view of a pertinent portion of a condenser lens according to a modification example of an embodiment.

FIG. 21 is a sectional view of a pertinent portion of the condenser lens 24 according to a modification example of the present embodiment. A condenser lens 44 illustrated in FIG. 21 includes the lens portion 24c2 disposed in front of an LED 20a2 and an expanding lens portion 24c4. The expanding lens portion 24c4 includes an entry portion 24c5 and a reflective surface 24c6. The entry portion 24c5 receives the light L1' emitted diagonally from the light emitting surface of the LED 20a2. The reflective surface 24c6 totally reflects the incident light L1' into the front direction of the condenser lens 44. This configuration can cause even the light L1' emitted from the light emitting surface in a direction closer to the horizontal direction to travel in the front direction of the condenser lens 44.

Fourth Embodiment

An optical unit that includes an optical member according to the present embodiment can be used in various vehicle lamps.

(Condenser Lens)

Figure 22:
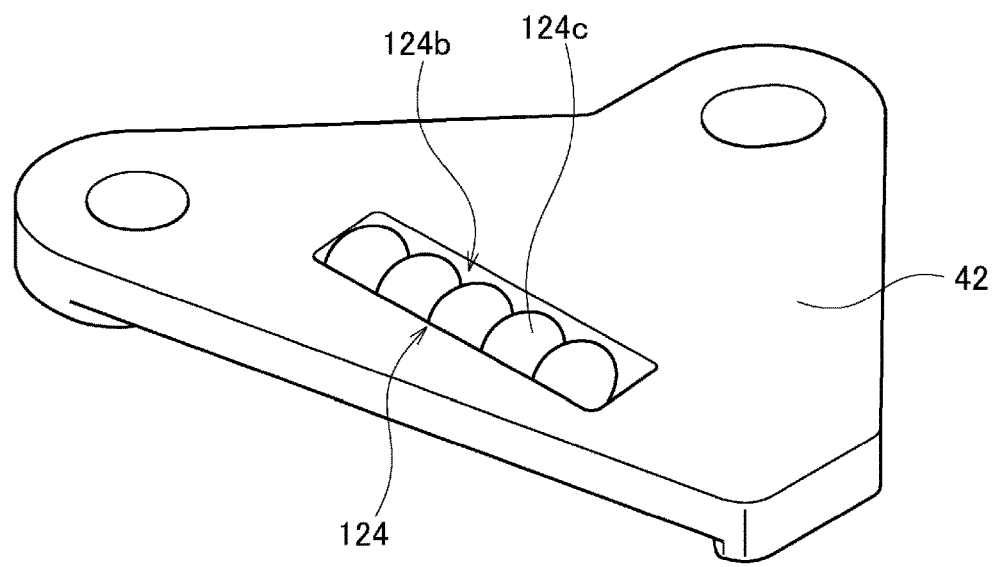
FIG. 22 is a perspective view of an optical member according to an embodiment.
Figure 23:
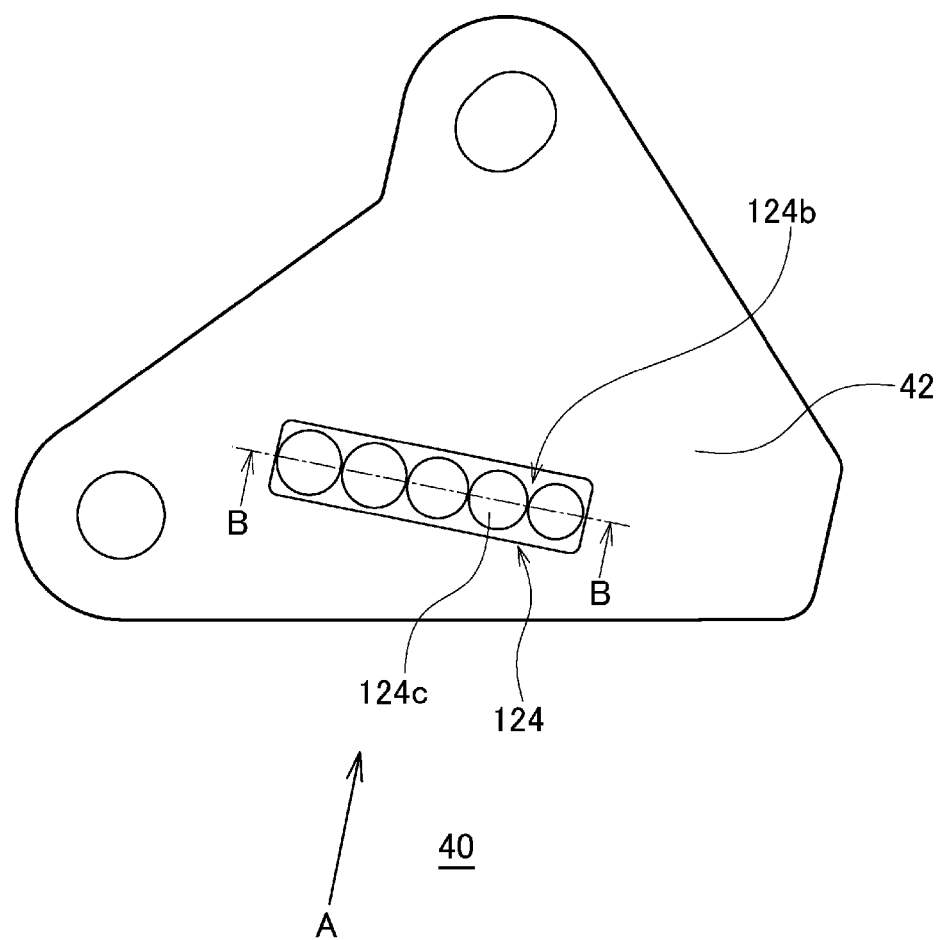
FIG. 23 is a top view of an optical member according to an embodiment.
Figure 24:
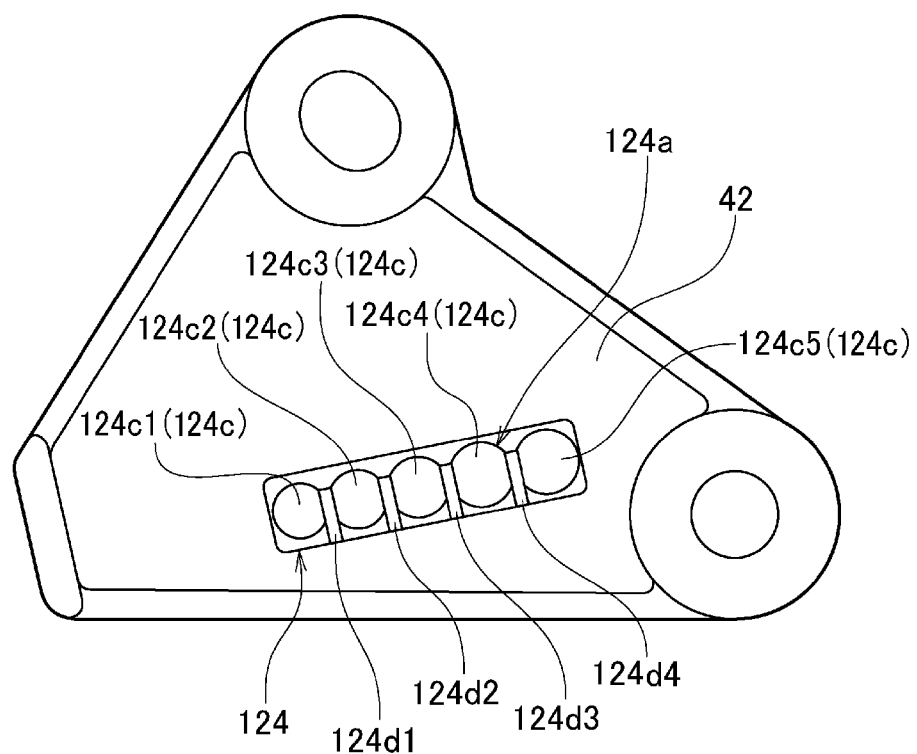
FIG. 24 is a rear view of an optical member according to an embodiment.

Next, an optical member according to the present embodiment will be described. FIG. 22 is a perspective view of the optical member according to the present embodiment. FIG. 23 is a top view of the optical member according to the present embodiment. FIG. 24 is a rear view of the optical member according to the present embodiment.

The optical member 40 according to the present embodiment includes a condenser lens 124 and a plate-like base portion 42. The condenser lens 124 serves as an optical controller that controls the light that enters the optical member 40 via a back side 124a to cause the light to exit via a front side 124b. The base portion 42 is adjacent to the condenser lens 124. The condenser lens 124 includes a plurality of lens portions (first lenses) 124c corresponding to the respective lights emitted from the LEDs 20a serving as a plurality of light emitting elements. In this example, to control light means to direct the light in a desired pattern, direction, or region, for example.

The lens portions 124c of the optical member 40 according to the present embodiment are each shaped to condense the light transmitted therethrough by refracting the light, and the LEDs 20a and the lens portions 124c are in one-to-one correspondence with each other. The lens portions 124c according to the present embodiment are each convex at its back side 124a as well as at its front side 124b. In the optical controller, a surface region of the front side 124b through which the light emitted from the LED 20a is transmitted to exit the optical controller functions as a light emitting surface of a pseudo-light source.

The thickness of the base portion 42 is no less than 0.1 mm and preferably about 0.3 mm to about 5 mm, and the optical member 40 is a thin component. The optical member 40 according to the present embodiment is a member in which a region other than the condenser lens 124 is large. Therefore, if the optical member 40 is to be fabricated integrally with the transparent condenser lens 124, the entire component needs to be formed of a transparent material.

The optical member 40 according to the present embodiment is an injection molded component formed of a transparent material and can be formed of, for example but not limited to, heat-resistant silicone, acryl, polycarbonate, or glass. Preferably, heat-resistant silicone (can resist the heat of 180° C. or higher) or glass is used, from the standpoint of its heat-resistant property. From the standpoint of the design flexibility of the shape of the optical member, heat-resistant silicone is more preferable as it can be forcibly removed from a mold relatively easily. Thus, even when the optical member has a somewhat complex shape, the optical member can be manufactured with a simple mold configuration or through a simple manufacturing method.

(Optical Path Changer)

As described above, the optical unit 18 according to the present embodiment includes the first light source 20, the condenser lens 124, the rotary reflector 22, and the convex lens 26. The plurality of LEDs 20a are disposed in an array in the first light source 20. The condenser lens 124 includes the plurality of lens portions 124c corresponding to the respective LEDs 20a and condenses the light emitted from the first light source 20. The rotary reflector 22 rotates about an axis of rotation while reflecting the light transmitted through the condenser lens 124. The convex lens 26 projects the light reflected by the rotary reflector 22 into the light illuminating direction (the front direction) of the optical unit 18.

Figure 25:
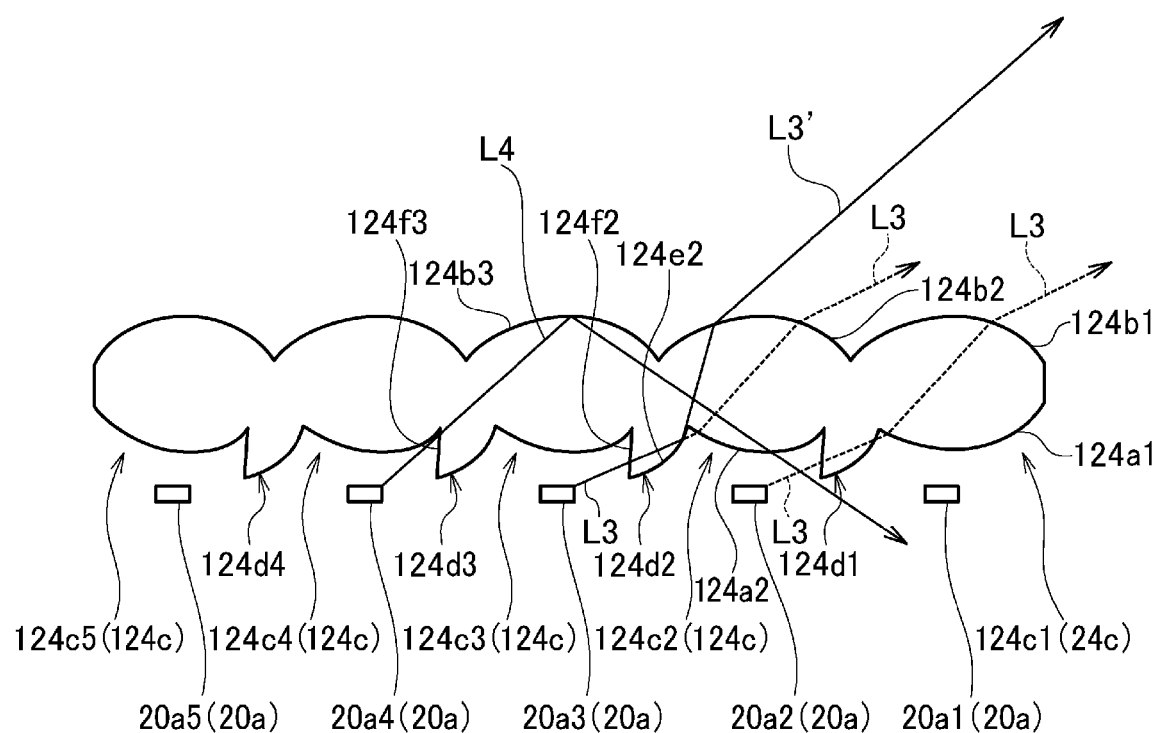
FIG. 25 is a schematic diagram illustrating the B-B section of the optical member illustrated in FIG. 23.
Figure 26:
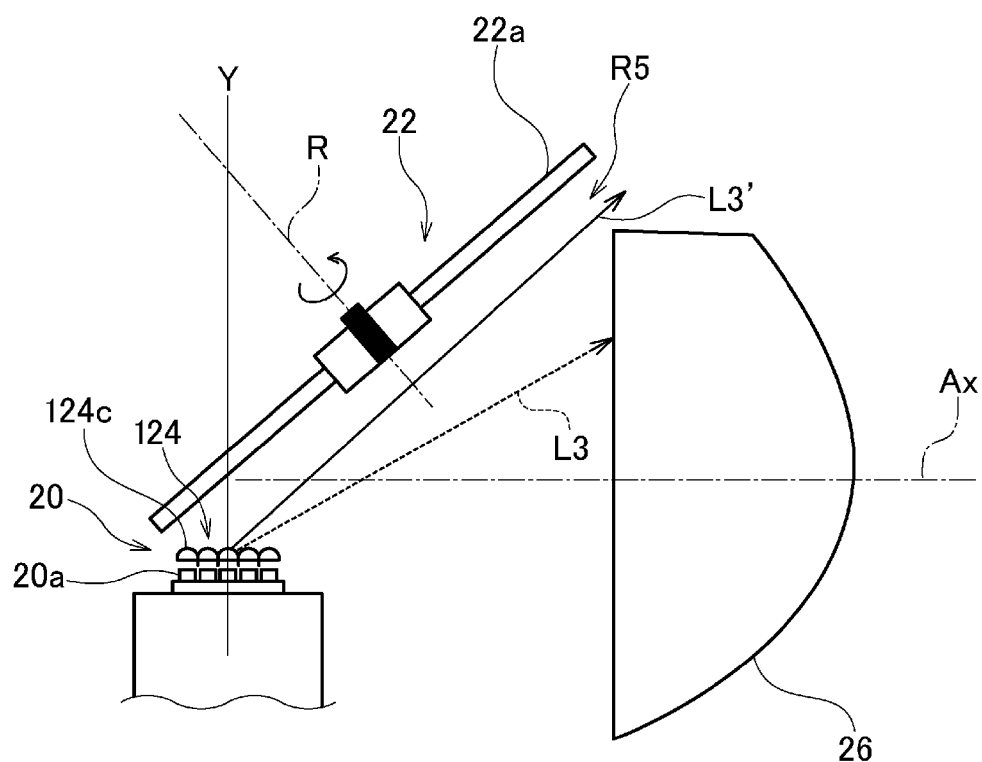
FIG. 26 schematically illustrates an optical path of light emitted diagonally from a light emitting element toward an optical member according to an embodiment.

The condenser lens 124 according to the present embodiment includes five lens portions 124c (124c1 to 124c5) arrayed in one row, as illustrated in FIGS. 22 to 24. FIG. 25 is a schematic diagram illustrating the B-B section of the optical member illustrated in FIG. 23. FIG. 26 schematically illustrates optical paths of lights emitted diagonally toward the optical member from the light emitting elements according to the present embodiment.

The plurality of lens portions 124c1 to 124c5 according to the present embodiment are in close contact with each other and disposed in an array. Therefore, there is a possibility that light emitted from one of the LEDs 20a1 to 20a5 directly enters an adjacent one of the lens portions 124c1 to 124c5. For example, of the light emitted from the LED 20a2 corresponding to the lens portions 124c2 illustrated in FIG. 25, light L3 that directly enters an entry surface 124a1 of the lens portion 124c1 adjacent to the lens portion 124c2 without being refracted and that exits via an exit surface 124b1 may enter the convex lens 26, as illustrated in FIG. 26.

Since the light L3 is not light controlled as being reflected by the rotary reflector 22, when the light L3 is projected forward via the convex lens 26, the light L3 may illuminate a region different from a desired light distribution pattern and may cause glare.

Accordingly, the condenser lens 124 according to the present embodiment includes optical path changers 124d1 to 124d4 for suppressing glare that could be caused by the light L3 described above. For example, the optical path changer 124d2 illustrated in FIG. 25 changes the optical path of light L3 of the light emitted from the LED 20a3 so that the light emitted from the LED 20a3 corresponding to the lens portion 124c3 does not directly enter an entry surface 124a2 of the lens portion 124c2 adjacent to the lens portion 124c3.

In other words, the optical path changer 124d2 makes it less likely that the light L3 of the light emitted from the LED 20a3 directly enters not the corresponding lens portion 124c3 but the lens portion 124c2 adjacent to the lens portion 124c3. Therefore, this configuration can suppress glare that could arise (in the optical path of the light L3 indicated by the dotted lines) when the light L3 emitted from the LED 20a3 directly enters the entry surface 124a2 of the lens portion 124c2 adjacent to the lens portion 124c3.

The optical path changer 124d2 includes a reflective surface 124e2 that totally reflects the incident light L3 toward an exit surface 124b2 of the lens portion 124c2 adjacent to the optical path changer 124d2. This configuration makes it possible to change the optical path of light L3' that exits the adjacent lens portion 124c2 via the exit surface 124b2.

The reflective surface 124e2 of the optical path changer 124d2 is configured such that the light L3' that exits the adjacent lens portion 124c2 via the exit surface 124b2 does not travel toward the convex lens 26, as illustrated in FIG. 26. With this configuration, the light L3 emitted diagonally from the LED 20a3 corresponding to the lens portion 124c3 turns into the light L3' that exits the adjacent lens portion 124c2 and does not enter the convex lens 26. Therefore, a situation where the light L3 is projected by the convex lens 26 to cause glare can be suppressed.

The optical path changer 124d2 includes an entry portion 124f2. The entry portion 124f2 receives the light L3 that is emitted diagonally from the light emitting surface of the LED 20a3 and that travels not toward the corresponding lens portion 124c3 but toward the lens portion 124c2 adjacent to the lens portion 124c3. The entry portion 124f2 is a projection portion (protruding portion) that projects from the lens portion 124c3 toward the opposing LED 20a3. The entry portion 124f2, constituted by the projection portion, is provided in a region between the lens portion 124c3 and the adjacent lens portion 124c2. This configuration makes it more likely that the light L3 emitted diagonally from the light emitting surface of the LED 20a3 corresponding to the lens portion 124c3 toward the adjacent lens portion 124c2 enters the optical path changer 124d2.

In the case described next, glare is suppressed as the light whose optical path has been changed by the optical path changer 124d3 exits the condenser lens 124 not via the front side 124b but via the back side 124a.

As illustrated in FIG. 25, the optical path changer 124d3 is provided such that light L4 emitted from the LED 20a4 corresponding to the lens portion 124c4 does not directly enter the lens portion 124c3 adjacent to the lens portion 124c4. The light L4 that has entered and been refracted by an entry portion 124f3 of the optical path changer 124d3 is transmitted through the inside of the condenser lens 124, is totally reflected by an exit surface 124b3 of the lens portion 124c3, and exits the condenser lens 124 via the back side 124a. With this configuration, of the light emitted from the LED 20*a*4, the light L4 traveling diagonally toward the lens portion 124*c*3 adjacent to the lens portion 124*c*4 does not exit the condenser lens 124 via the front side 124*b*, and thus glare is suppressed.

The optical path changers 124*d*1 to 124*d*4 described above all have similar functions. The optical path changers 124*d*1 to 124*d*4 may all have the same shape, or one or more or all of the optical path changers 124*d*1 to 124*d*4 may differ in terms of their shape, configuration, or the like.

As illustrated in FIG. 26, the optical unit 18 according to the present embodiment includes the rotary reflector 22 that rotates about the axis of rotation R while reflecting the light transmitted through the condenser lens 124 toward the convex lens 26. The first light source 20 is disposed such that the vertical direction Y of the light emitting surfaces of the LEDs 20*a* intersects with the optical axis Ax of the convex lens 26. The rotary reflector 22 is disposed such that the axis of rotation R is inclined relative to both the vertical direction Y of the light emitting surfaces and the optical axis Ax. In this example, an optical axis can be regraded, for example, as a straight line that is parallel to light incident on a lens and passes through a focal point at which a parallel light incident on the front surface of the lens is condensed. Alternatively, a straight line that passes through the highest part of a convex lens and extends in the front-back direction of the vehicle within a horizontal plane can be regarded as the optical axis. Alternatively, in the case of a circular (circular arc-shaped) lens, a straight line that passes through the center of the circle (circular arc) and extends in the front-back direction of the vehicle within a horizontal plane can be regarded as the optical axis. Therefore, it can be said that the blades 22*a* each have a twisted shape in which the angle formed by the axis of rotation R and the reflective surface changes along the circumferential direction centered on the axis of rotation R. The condenser lens 124 is disposed between the plurality of LEDs 20*a* and the rotary reflector 22. As described above, the optical path changers 124*d*1 to 124*d*4 are configured such that the light that exits an adjacent lens portion 124*c* via its exit surface travels toward a gap region R5 that lies between the convex lens 26 and the rotary reflector 22. This configuration keeps the lights L3 and L4 whose optical paths have been changed by the optical path changers 124*d*1 to 124*d*4 from being projected forward by the convex lens 26, and this can keep glare from arising in front of the vehicle.

The optical unit 18 according to the present embodiment is configured to be capable of emitting a variable high beam when the plurality of LEDs 20*a* are turned on or off individually. Therefore, in a case where the LED 20*a*2 illustrated in FIG. 25 is turned off and the LED 20*a*3 illustrated in FIG. 25 is turned on, if a part of the light emitted from the LED 20*a*3 directly exits the lens portion 124*c*2 corresponding to the LED 20*a*2 that is off, the light may illuminate a region that is not supposed to be illuminated. In this respect, the optical unit 18 according to the present embodiment includes the optical path changers 124*d*1 to 124*d*4. Therefore, glare can be kept from arising in a non-illumination region (shaded portion) formed in a part of a light distribution pattern formed by a variable high beam.

The optical unit according to a modification example of the present embodiment does not need to include the rotary reflector 22. For example, a light emitting surface of a light source that includes a plurality of light emitting elements disposed in a matrix may be disposed so as to oppose an entry surface of a projection lens, and the optical member according to the present embodiment may be disposed between the projection lens and the light emitting surface of the light source.

Thus far, the present invention has been described with reference to the foregoing embodiments. The present invention, however, is not limited by the foregoing embodiments, and the present invention further encompasses an embodiment obtained by combining and/or replacing configurations of the foregoing embodiments as appropriate. In addition, it is also possible to change the combinations and/or the processing orders in the foregoing embodiments or to add modifications such as various design changes to the foregoing embodiments based on the knowledge of a person skilled in the art, and an embodiment obtained by adding such modifications can also be encompassed by the scope of the present invention.

For example, in the convex lens 26 according to the foregoing embodiments, the horizontally diffusing portion is formed in a portion of the entry surface, and the vertically diffusing portion is formed in substantially the entire surface of the exit surface. Alternatively, the vertically diffusing portion may be formed in the entire surface of the entry surface, and the horizontally diffusing portion may be formed in a portion of the exit surface.

The rotary reflector 22 that includes the blades 22*a* is used in the foregoing embodiments. Alternatively, a polygon mirror, instead of the rotary reflector 22, may be used. Alternatively, a micro-electromechanical system (MEMS) mirror (resonance mirror), instead of the rotary reflector 22, may be used. Alternatively, instead of the rotary reflector 22, a digital micromirror device (DMD) in which a number of movable micromirrors are arrayed in a matrix may be used.

In the foregoing embodiments, a combination of a light source including a plurality of light emitting elements and an optical member including a plurality of first lenses has been described. Alternatively, a light source including one light emitting element and an optical member including one first lens may be combined. With this embodiment as well, the luminous region of the first lens can be expanded by the expanding lens portion 24*c*3, and thus the size of the illumination region of the light distribution pattern can be increased.

The first light source 20 according to the foregoing embodiment includes five LEDs 20*a* arrayed in one row. Alternatively, a light source in which a larger number of light emitting elements are disposed in an array or a matrix may be used.

While the preferred embodiments of the present invention have been described using specific terms, such description is for illustrative purposes only, and it is to be understood that changes and variations may be made without departing from the spirit or scope of the appended claims.

APPENDIX

It is to be noted that Embodiments described above may be expressed by the items described hereinafter.

Item 1. An optical unit, comprising:
 a first light source;
 a second light source including a plurality of light emitting elements;
 a rotary reflector that rotates about an axis of rotation while reflecting first light emitted from the first light source;

a projection lens that projects the first light reflected by the rotary reflector into a light illuminating direction of the optical unit to form a first light distribution pattern; and an optical member that deflects an optical path of second light emitted from the second light source away from the rotary reflector to direct the optical path toward the projection lens, wherein the projection lens is configured to project the second light into the light illuminating direction of the optical unit to form a second light distribution pattern such that the second light distribution pattern illuminates an outward region of the first light distribution pattern in a right-left direction, and the optical member is configured to form the second light distribution pattern by superposing partial light distribution patterns formed by respective element lights emitted from the plurality of light emitting elements.

Item 2. The optical unit according to item 1, wherein
the optical member includes a light controlling surface that controls separately optical paths of the respective element lights emitted from the plurality of light emitting elements.

Item 3. The optical unit according to item 2, wherein
the light controlling surface includes an entry surface that includes
a first light controlling surface that receives second light emitted from one of the plurality of light emitting elements, and a second light controlling surface that receives
second light emitted from another one of the plurality of light emitting elements, the second light controlling surface being different from the first light controlling surface.

Item 4. The optical unit according to item 3, wherein the first light controlling surface and the second light controlling surface are disposed next to each other in an up-down direction.

Item 5. The optical unit according to item 3, wherein
the light controlling surface includes an exit surface serving as a continuous third light controlling surface via which the second light that has entered the optical member via the first light controlling surface and the second light that has entered the optical member via the second light controlling surface exit the optical member.

Item 6. The optical unit according to item 1, wherein
the second light source is disposed such that the second light transmitted through the optical member enters the projection lens via a region that lies on an outer side of a region where the first light enters the projection lens.

Item 7. An optical unit, comprising:
a light source including a plurality of light emitting elements;
a first lens that projects light emitted from the light source into a light illuminating direction of the optical unit to form a light distribution pattern; and
a second lens that directs an optical path of the light emitted from the light source toward the first lens, wherein
the second lens is configured to form the light distribution pattern by superposing partial light distribution patterns formed by respective element lights emitted from the plurality of light emitting elements.

Item 8. An optical unit, comprising:
a light source including a light emitting element;
a first lens that corresponds to the light emitting element and condenses light emitted from the light emitting element; and
a second lens that projects light transmitted through the first lens into a light illuminating direction of the optical unit to form a light distribution pattern, wherein
the first lens includes a condensing lens portion located in front of a light emitting surface of the light emitting element and an expanding lens portion that expands a luminous region of the first lens by receiving light emitted diagonally from the light emitting surface and causing the light to exit the first lens into a front direction of the first lens.

What is claimed is:

1. An optical unit, comprising:
a first light source;
a second light source;
a rotary reflector that rotates about an axis of rotation while reflecting first light emitted from the first light source; and
a projection lens that projects the first light reflected by the rotary reflector into a light illuminating direction of the optical unit to form a first light distribution pattern, wherein
the second light source is disposed such that second light emitted from the second light source enters the projection lens without being reflected by the rotary reflector, and
the projection lens
is configured to project the second light into the light illuminating direction of the optical unit to form a second light distribution pattern such that the second light distribution pattern overlaps an end portion of the first light distribution pattern in a right-left direction, and
includes a horizontally diffusing portion formed in a portion of the projection lens, the horizontally diffusing portion diffusing the second light mainly in the right-left direction.

2. The optical unit according to claim 1, wherein
the projection lens includes an entry surface having a first entry region that receives the first light and a second entry region that receives the second light, and
the horizontally diffusing portion is formed in the second entry region.

3. The optical unit according to claim 2, wherein
the horizontally diffusing portion has a smaller area than the second entry region.

4. The optical unit according to claim 2, wherein
the projection lens further includes an exit surface via which the first light and the second light exit the projection lens, and
the exit surface includes a vertically diffusing portion formed therein, the vertically diffusing portion diffusing the first light and the second light mainly in an up-down direction.

5. The optical unit according to claim 2, wherein
the first entry region is a non-diffusing portion.

* * * * *